(12) United States Patent
Yager

(10) Patent No.: US 11,162,436 B2
(45) Date of Patent: Nov. 2, 2021

(54) CAMLESS ENGINE VALVE CONTROL SYSTEM

(71) Applicant: James Henry Yager, Northville, MI (US)

(72) Inventor: James Henry Yager, Northville, MI (US)

(73) Assignee: JHYAGER CONSULTING L.L.C., Northville, MI (US)

( * ) Notice: Subject to any disclaimer, the term of this patent is extended or adjusted under 35 U.S.C. 154(b) by 0 days.

(21) Appl. No.: 17/020,732

(22) Filed: Sep. 14, 2020

(65) Prior Publication Data

US 2021/0207545 A1    Jul. 8, 2021

Related U.S. Application Data

(60) Provisional application No. 62/899,408, filed on Sep. 12, 2019.

(51) Int. Cl.
*F02D 13/02* (2006.01)
*F01L 9/10* (2021.01)

(52) U.S. Cl.
CPC ............ *F02D 13/0253* (2013.01); *F01L 9/10* (2021.01); *F01L 2201/00* (2013.01)

(58) Field of Classification Search
CPC .................. F01L 9/10; F02D 13/0253

USPC ................ 123/90.12, 90.13, 90.15
See application file for complete search history.

(56) References Cited

U.S. PATENT DOCUMENTS

| 2013/0074790 | A1* | 3/2013 | Rabhi | F01L 9/10 |
| | | | | 123/90.11 |
| 2014/0190429 | A1* | 7/2014 | Khajepour | F01L 25/02 |
| | | | | 123/90.12 |
| 2018/0363516 | A1* | 12/2018 | Yager | F02D 13/0253 |

* cited by examiner

*Primary Examiner* — Jorge L Leon, Jr.
(74) *Attorney, Agent, or Firm* — Mitchell Law PLLC; Matthew W. Mitchell

(57) ABSTRACT

A camless valve control system for an internal combustion engine in disclosed. The system includes a hydraulic distributor, having a rotating distributor shaft timed to the operation of the engine, the rotating distributor shaft comprising an internal flow dividing plug channeling an internal hydraulic flow to first and second portions of the rotating distributor shaft; an opening control ring oriented coaxially with the rotating distributor shaft with at least one hole configured to cyclically align with the rotating distributor shaft and provide opening hydraulic control to open a controlled valve, and a closing control ring oriented coaxially with the rotating distributor shaft with at least one hole configured to cyclically align with the rotating distributor shaft and provide closing hydraulic control to close the controlled valve.

19 Claims, 39 Drawing Sheets

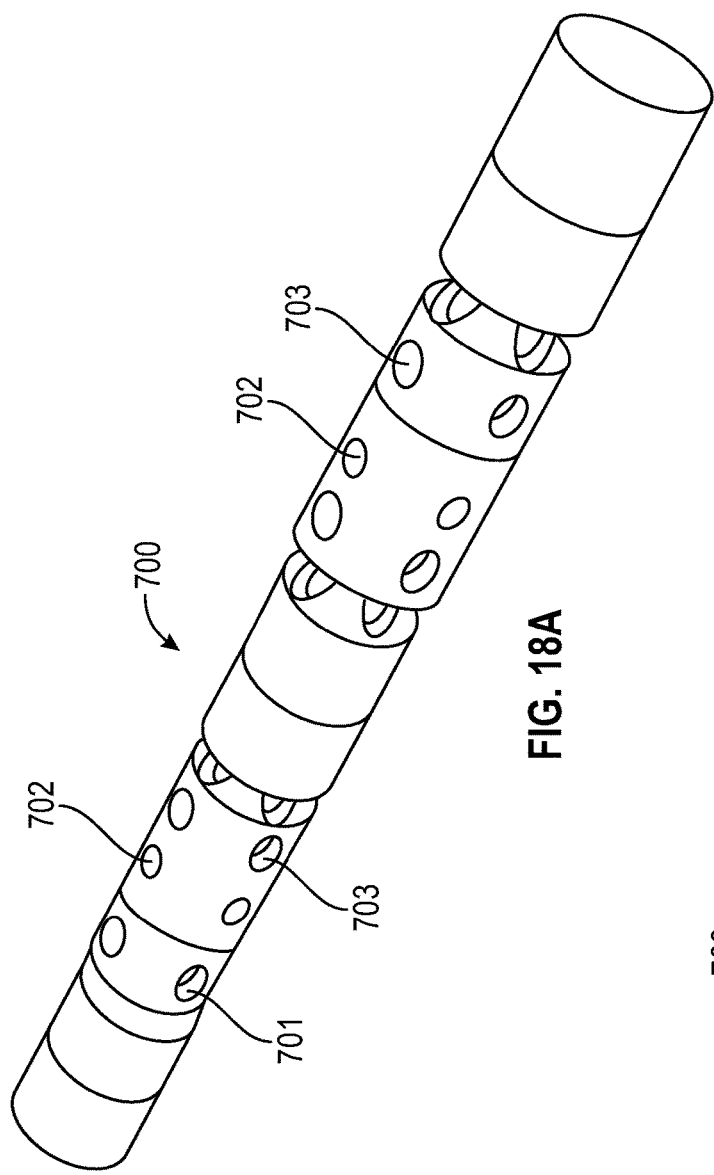
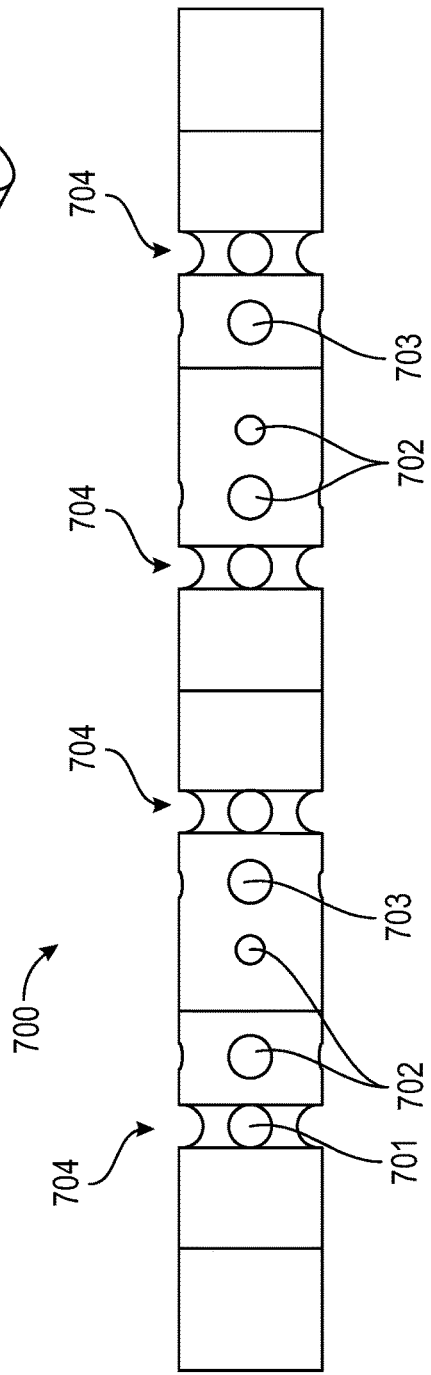
FIG. 18A
FIG. 18B

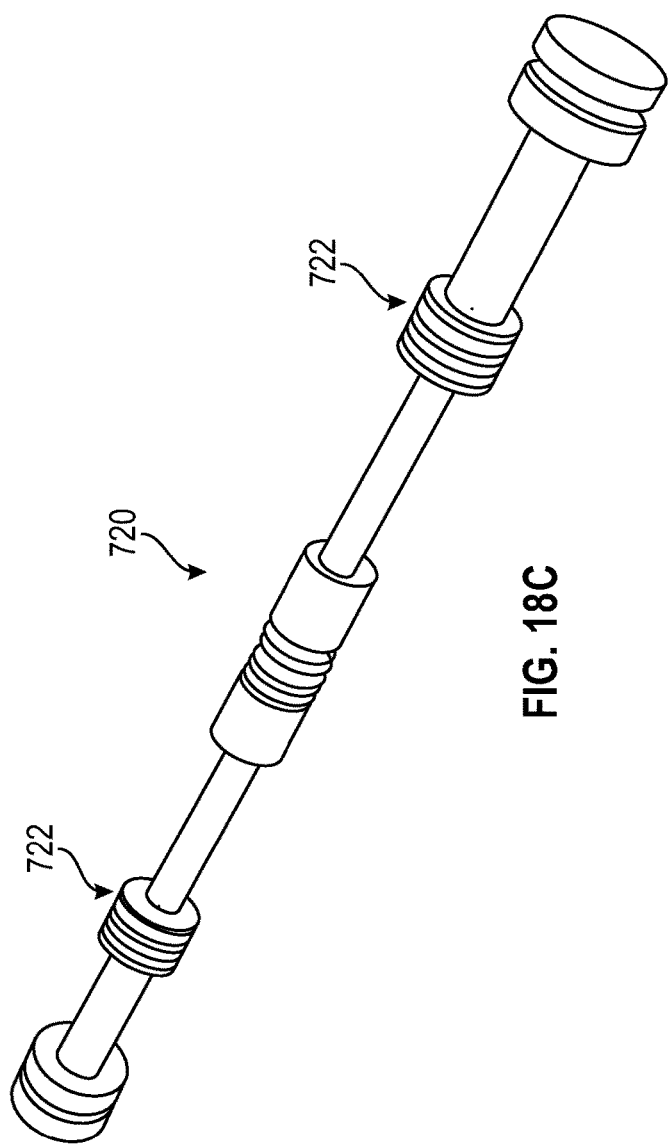
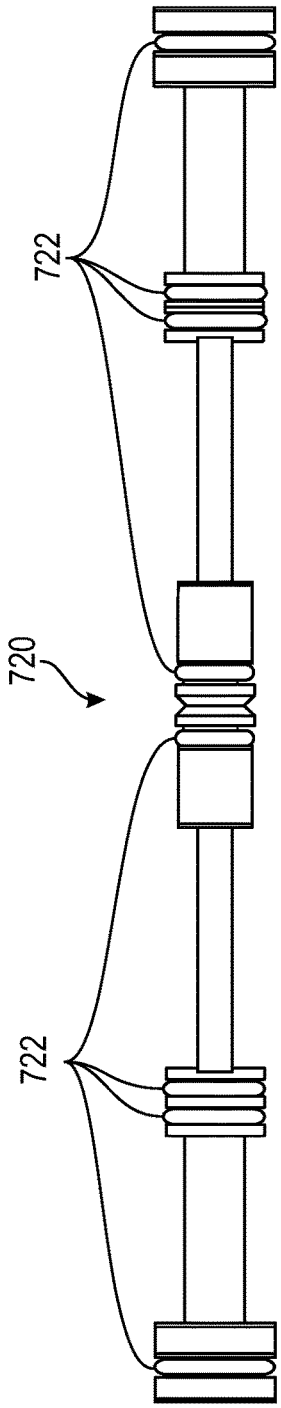
FIG. 18C
FIG. 18D

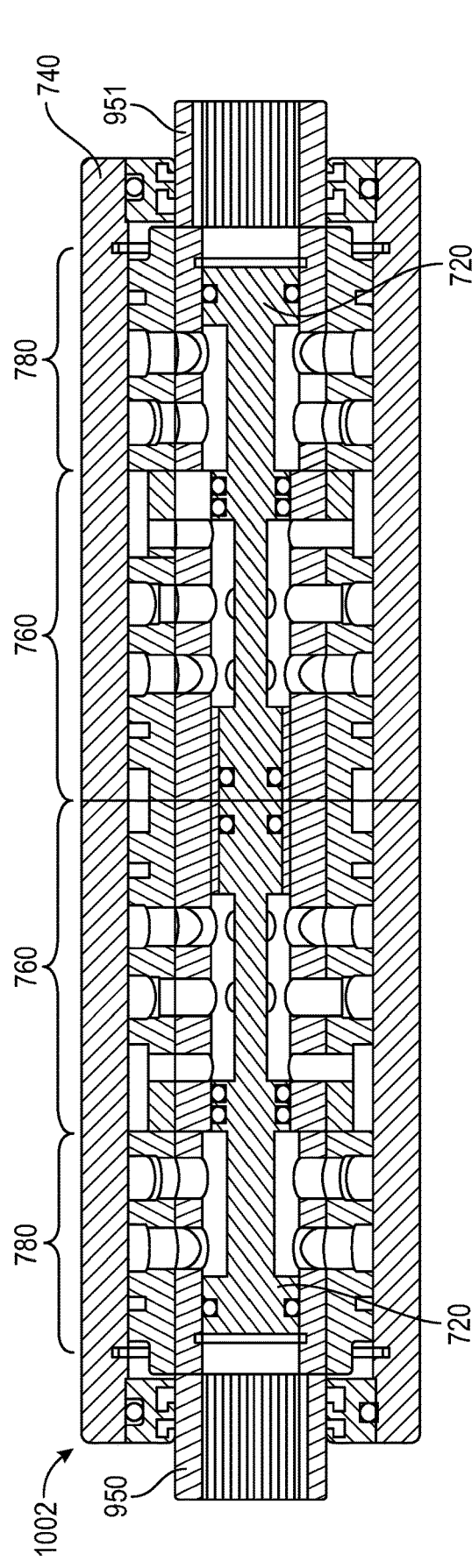
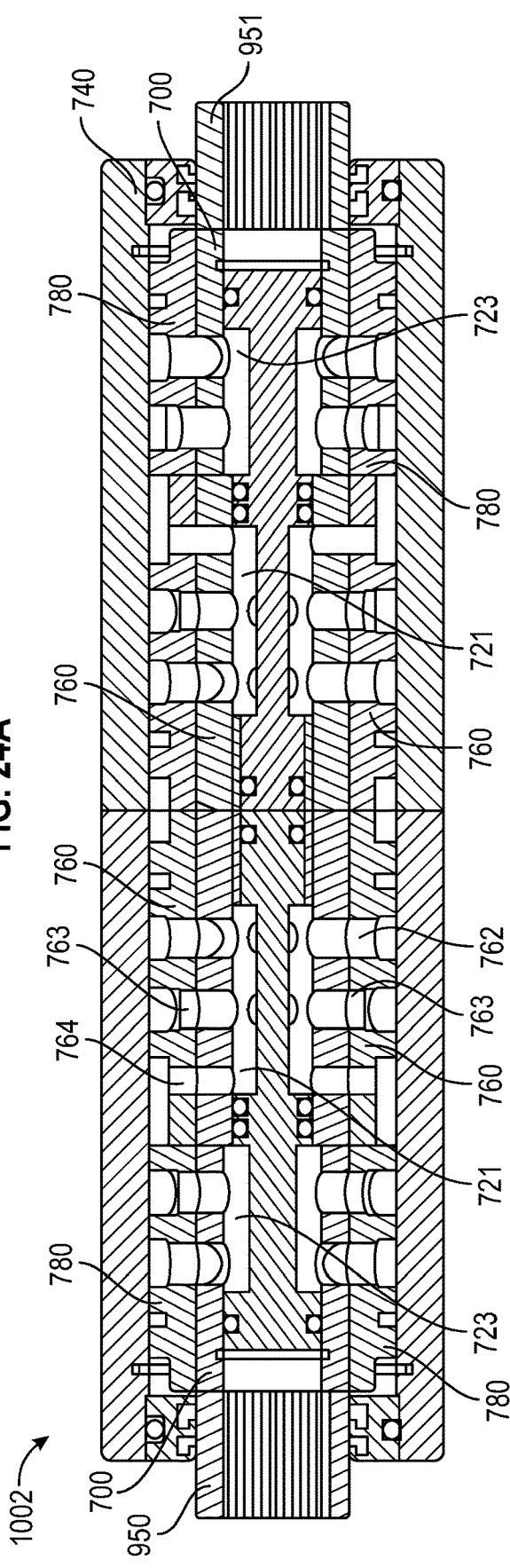
FIG. 24A
FIG. 24B

CAMLESS ENGINE VALVE CONTROL SYSTEM

CROSS REFERENCE TO RELATED APPLICATIONS

This application claims the benefit of Provisional Application No. 62/899,408 filed on Sep. 12, 2019 which is hereby incorporated herein by reference.

TECHNICAL FIELD

This disclosure is related to internal combustion engine control, particularly to a camless system for controlling intake and exhaust valve actuation.

BACKGROUND

The statements in this section merely provide background information related to the present disclosure. Accordingly, such statements are not intended to constitute an admission of prior art.

Internal combustion engines include one or more intake valves controlling intake flow into a combustion chamber and one or more exhaust valves controlling exhaust flow from the combustion chamber. Valve control includes opening and closing the valves as various times during a combustion cycle. One known method to control valves includes a timed rotating camshaft, which by rotation of at least one non-circular cam displaces the valves from a closed condition to accomplish the desired opening and closing of the valves.

Almost all modern automotive engines have gone to flexible valvetrains for performance, fuel economy, and emissions reasons. Valve control in both magnitude, timing, and duration can greatly impact operation of the engine. A camshaft is only one method for controlling valve operation. Camshafts are somewhat limited in how much variation or flexibility a spinning cam can afford the valve operation. Camless systems provide flexibility, removing the limitations of the spinning camshaft from available valve control options.

Almost all engine manufactures would like the flexibility of camless valve control but avoid it for the following reasons plaguing all currently available systems: system cost, reliability and durability, package size, and parasitic losses. Hence, there is a need for a an efficient camless vale control system.

BRIEF DESCRIPTION OF THE DRAWINGS

One or more embodiments will now be described, by way of example, with reference to the accompanying drawings, in which:

FIGS. 18A and 18B illustrate components of an alternative exemplary rotating distributor shaft; and FIGS. 18C and 18D show an exemplary internal flow dividing plugs, in accordance with the present disclosure.

FIGS. 24A and 24 B is a cross-sectional view, illustrating an exemplary position of a distributor shaft, an internal flow dividing plug, and a plurality of control rings in an assembled state, in accordance with the present disclosure.

DETAILED DESCRIPTION

Figure 1A:
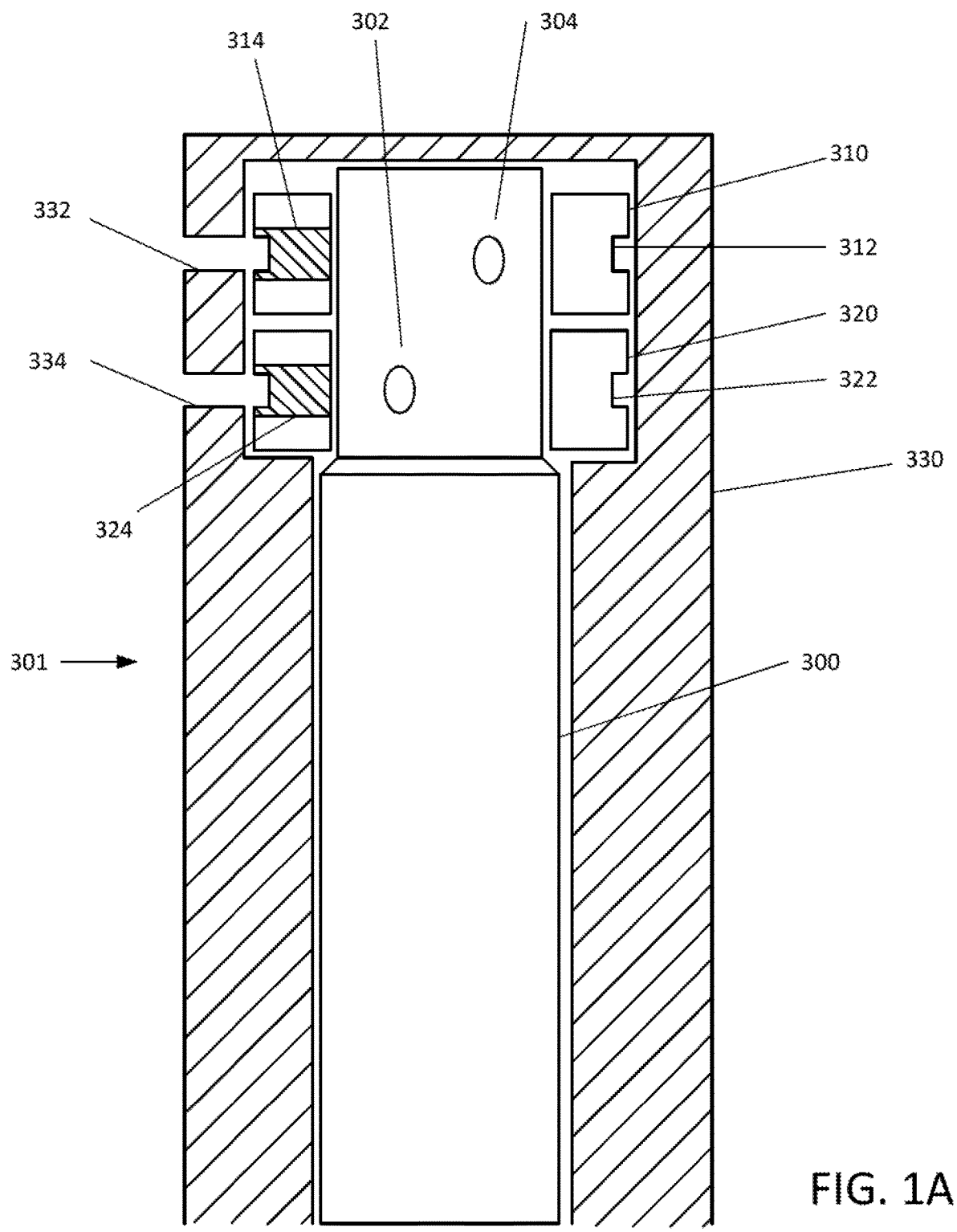
FIG. 1A illustrates an exemplary hydraulic distributor useful to control engine intake and exhaust valves, in accordance with the present disclosure.

A camless valve control system is disclosed. In one embodiment, the camless valve control system utilizes hydraulic control to actuate intake and exhaust cylinder valves. As compared to systems utilizing overhead cams or pusher rods, the disclosed system provides for flexibility and efficiency. The disclosed camless valve control system is a robust cost effective system in a package size which is compact and provides the opportunity to reduce engine height and length. The system in one embodiment is electro-hydraulic and uses hydraulics for the motive force. Most of the hydraulic energy is recovered with an energy recovery system, providing control with low parasitic losses.

The camless valve control system can utilize a distributor system to control all valves with the minimum number of control actuators. In one more complex variation, four control actuators are used to create a completely flexible system, although embodiments with more or less actuators are envisioned by the disclosure herein. The system can employs limits on control rings within the distributor system which mitigates risk of valve to piston contact.

In an exemplary embodiment, control resides in a single unit capable of driving up all valves on up to a 12-cylinder engine with a single hydraulic distributor. Higher cylinder counts can be achieved with multiple systems in various embodiments. The valves are driven with a positive displacement hydraulic system which controls the lift, removing the need for valve position sensors. The system uses valve actuators or simple two stage hydraulic cylinders which control opening and seating velocities and eliminate the need for lash adjusters. Multiple stage hydraulics provide the ability to open against high cylinder pressures while minimizing hydraulic oil pressure and flow requirements.

In one embodiment, the control system utilizes a hydraulic pump. The pump can be either a fixed displacement or a variable displacement swash plate hydraulic pump. In one example, the pump can be driven at one half engine speed. The hydraulic distributor can be timed to the engine. The hydraulic distributor may serve as a distributor of the hydraulic fluid to all of the engine valves both intake and exhaust valves with one pump being capable of driving up to all valves on a 12-cylinder engine.

Additional cylinders or an extremely long opening or closing ramp may require additional hydraulic distributors with each pump operating a subset of the engine valves. With multiple systems any number of cylinders is possible.

The hydraulic distributor will have radial ports spaced evenly around the circumference of the distributor housing with each port being connected to a supply and a drain control ring. The control rings can be inside of the distributor housing and will be capable of rotating through an angle of approximately 90 degrees to provide variation in the engine valve opening and closing positions.

In various embodiments, hydraulic sealing is accomplished with small clearances between the diameters of the pump distributor, the control rings, and the pump housing which will control the leakage.

The control rings can have a series of circumferential grooves, separated by a short distance, communicating with the ports on the outside of the hydraulic distributor. With high cylinder counts that require a large amount of timing variation, a single grove may be replaced with two or more parallel grooves on the same control ring with the some of the ports being axially staggered to align with the additional groove(s). With this configuration, there can be multiple supply and drain ports to align with the additional grooves. The grooves can be in communication with the port that it is supplying hydraulic oil to or draining hydraulic oil from. Each of the grooves may have a single radial hole that communicates with the supply or drain port/ports on the hydraulic distributor. The ports to the engine valve actuators will be closed during valve dwell open or closed In one embodiment, the hydraulic distributor shaft will rotate inside the control rings at half engine speed and will serve as a distributor to control which port is receiving or draining the hydraulic oil. In another embodiment, the control rings will rotate at half-engine speed and will serve as a distributor to control which port is receiving or draining the hydraulic oil.

All intake and all exhaust ports will remain in phase with each other. As an example, a four-cylinder engine with two valves per cylinder will have a total of eight ports, four intake and four exhaust, spaced at 90 degrees apart. The supply lines to the valve actuators will be connected in the firing order of the engine around the pump. The distributor can operate with one ignition source providing power to all of the spark plugs.

The variation of the opening and closing of the valves will be controlled by the four control rings in the pump which will change the angular position of the opening of the supply and drain ports. During valve closing, the closing port will be in communication with the appropriate valve and returning oil to the inlet side of the hydraulic pump.

In various embodiments, the pump/pumps can operate with one portion driving the exhaust valves and the other driving the intake valves. The use of two pumps is possible with a single cylinder and swash plate by angling the outlets to a smaller or larger radius on every other piston and by having them communicate with two sets of kidney slots one driving the inlet valves and the other driving the exhaust valves. Separate gear pumps can also be used to drive the system.

The inlet of the pump, like the outlet, will be positive displacement and due to this fact the return rate will be proportional to engine speed which will cause the valves to close in a given number of crank degrees determined by the pump layout. With a variable swash plate angle this rate can be changed.

The oil being returned to the pump will be pressurized by the energy in the valve spring and will be returning energy back to the pump, thereby reducing parasitic losses.

In one embodiment, the oil used by the pump to actuate the cylinder valve positions will be a separate loop of hydraulic oil. In another embodiment, the oil used by the pump to control the cylinder valves will be the engine oil utilized to lubricate the engine. In such an embodiment, the pump will be supplied with both return oil from the hydraulic control circuits and low pressure oil from the engine. This oil will keep the inlet side of the pump filled and it can be supplied with a check valve to prevent it from flowing out of the pump during valve closing when higher pressure oil is being returned to the pump.

Limits on the control ring travel will make porting positions that would result in valve-to-piston contact impossible.

Figure 7:
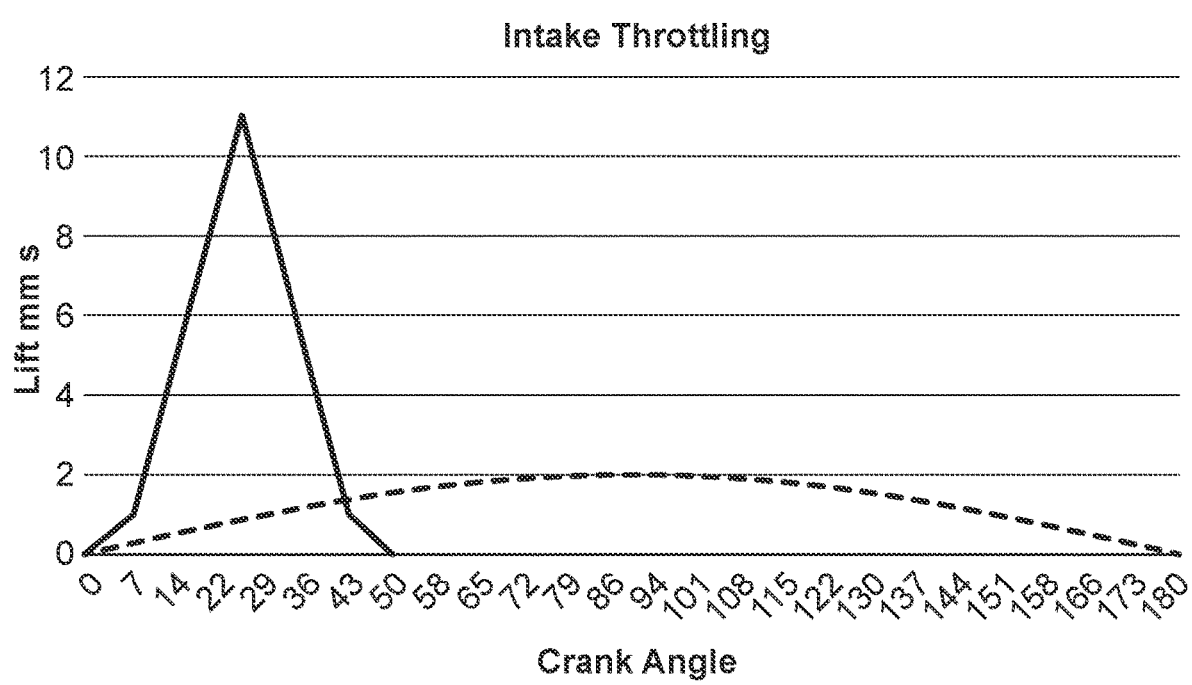
FIG. 7 graphically illustrates improved control of an exemplary intake valve during an intake throttling event, enabling the system to incur minimized pumping losses as compared to a known camshaft controlled system, in accordance with the present disclosure.

By disconnecting cylinder valve control from rotation of a cam which is typically connected via a timing chain to the engine, various control methods can be utilized to achieve unconventional results in engine control. In one example, it is possible to have the closing ports open for a portion of the valve opening event to reduce the opening height and to shorten the valve duration when desired for intake throttling or possibly in some braking situations. FIG. 7 graphically illustrates improved control of an exemplary intake valve during an intake throttling event, enabling the system to incur minimized pumping losses as compared to a known camshaft controlled system.

During valve opening the opening port will be in communication with the appropriate valve and supplying oil from the high pressure side of the hydraulic pump. The pump/pumps will have in essence two pumps with one portion driving the exhaust valves and the other driving the intake valves. The outlet of the pump, like the inlet, will be positive displacement and therefore the opening rate will be proportional to engine speed, which can cause the valves to open in a given number of crank degrees determined by the pump layout. With a variable swash plate angle, this rate and valve lift can be changed.

The pump can supply oil to the multiple stage valve actuators and will only supply the pressure required to move the engine valves against the spring force and the pressure differential across the valve head. The opening control rings will have vents built into them that will allow the supply pressure to drop to a very low level when not supplying oil to open the valves, i.e. low parasitic driving power.

Limits on the control ring travel will make porting positions that would result in valve-to-piston contact impossible.

FIG. 1A illustrates an exemplary hydraulic actuator useful to control engine intake and exhaust valves, in accordance with the present disclosure. Hydraulic distributor 301 is illustrated including rotating cylindrical pump body 300, supply control ring 320, return control ring 310, and actuator body 330. Pump body 300 is attached to the hydraulic pump device, and in particular, receives mechanical torque from the pump device in order to precisely turn pump body 300 with the turning of the pump device, which in turn is precisely turned with the vehicle engine through a timing chain device known in the art. The pump body 300 can be described to include a central a cylindrical center portion configured to receive torque from the hydraulic pump and at least one channel providing a flow of hydraulic control fluid from the pump.

In accordance with an exemplary 4-stroke engine, which completes a combustion cycle in two revolutions of the crank shaft of the engine, the pump bodies of the disclosed system can be connected to the engine in order to turn once for every two turns of the engine crank shaft. In this way, one revolution of the pump bodies can control one combustion cycle and the corresponding valve open and close events in direct timing with the engine.

The pump body 300 includes internal passages which connect hole 302 with a supply of pressurized hydraulic oil from the connected pump device and which connect hole 304 with an oil return sump, making oil returning from the controlled valve available to the pump to be used again in the system. The pump body 300 may be referred to as a hydraulic distributor shaft or a hydraulic actuator herein.

Supply control ring 320 and return control ring 310 can be static, meaning that they do not turn while the distributor shaft 300 rotates. Such static control rings can be positioned and configured once for an optimal performance setting. In another embodiment, one or both of control rings 320 and 310 can be turned some small amount, for example, up to 90 degrees, with the different locations of the vent holes and other geometry of the control rings changing timing of the intake and exhaust valves for the engine. Such small movement of the control rings can be controlled, for example, by electrical servo motors or electric actuators controlled by an engine control module, for example, a computerized engine controller monitoring torque demands and engine conditions to apply pre-programmed calibrated engine control schemes. The unique and individual control of the intake and exhaust valves enabled by the disclosed system enables control schemes unknown to date.

Supply control ring 320 includes a communication groove 322 traveling around some portion of the circumference of control ring 320 and includes at least one vent hole 324. Rotational alignment of hole 302 with hole 324 determines an opening of the attached engine valve. Return control ring 310 includes a communication groove 312 traveling around some portion of the circumference of control ring 310 and includes at least one vent hole 314. Rotational alignment of hole 304 with hole 314 determines an opening of the attached engine valve.

Distributor housing 330 encloses the control rings and pump body 300 and includes holes 334 and 332 connected to supply and return hydraulic lines, respectively.

The exemplary hydraulic distributor 301 has two control rings, one supply and one return, so it would only be capable of controlling either intake or exhaust valves. Another embodiment of a pump according to the disclosure could have double the control rings a set for intake valves and a set for exhaust valves. The aluminum part in this model, the pump cylinder/distributor portion of FIG. 2A, could be the cylinder of the swash plate pump. If not it would need to be rotating with the pump to control timing. In one embodiment, it could be incorporated into the cylinder of the swash plate to reduce cost and package size.

Figure 1B:
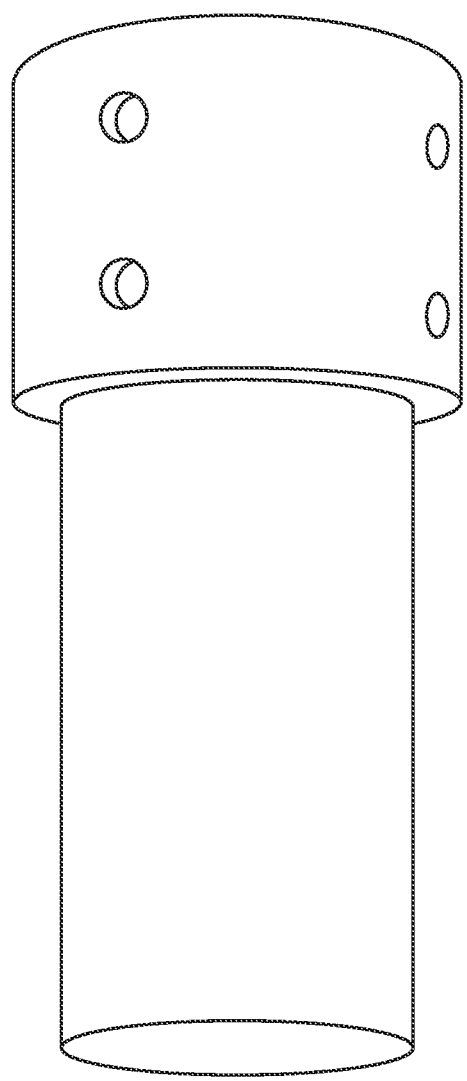
FIG. 1B illustrates an exemplary embodiment of the distributor of FIG. 1A, in accordance with the present disclosure.

FIG. 1B illustrates an exemplary embodiment of the supply and return control rings as a single integral unit, enabling simplified control of the timings. In one embodiment, the illustrated control ring can be adjustable as a unit. In another embodiment, the illustrate control ring can be fixed, for example with a notch or notches mating with a corresponding tab on the mating housing, to set the timings of the hydraulic actuator permanently.

Figure 2A:
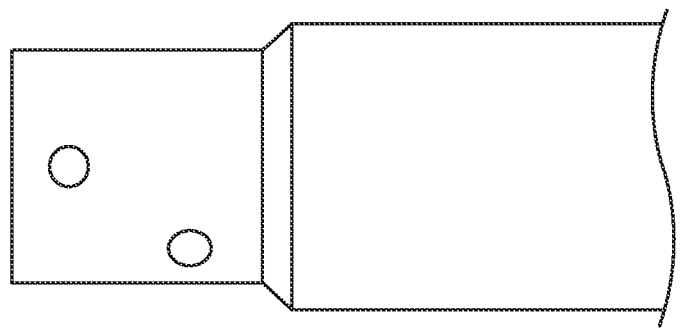
FIG. 2A illustrates an exemplary distributor shaft of the hydraulic distributor of FIG. 1, in accordance with the present disclosure.

FIG. 2A illustrates an exemplary pump body of the hydraulic actuator of FIG. 1, in accordance with the present disclosure. Hydraulic pump 300 is illustrated including supply hole 302, return hole 304, and attached internal passages 305 permitting oil to be conducted through pump body 300.

Figure 2B:
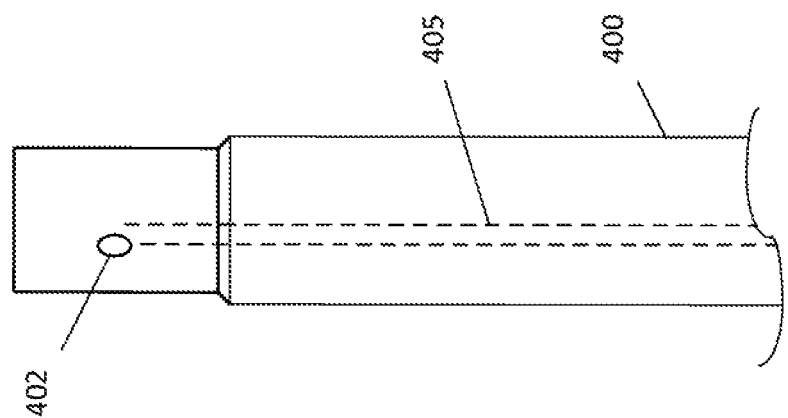
FIG. 2B illustrates an exemplary alternative distributor shaft of FIG. 2A, in accordance with the present disclosure.

FIG. 2B illustrates an exemplary alternative to the distributor shaft of FIG. 2A, in accordance with the present disclosure. Distributor shaft 400 is illustrated including a single hole 402 and a single internal passage 405.

Figure 2C:
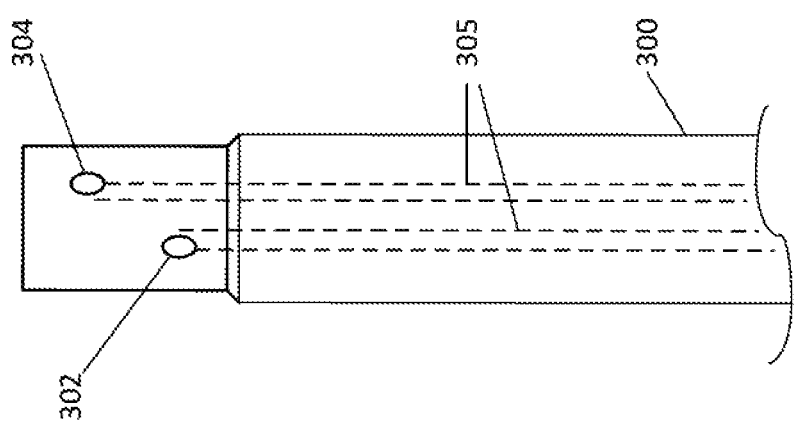
FIG. 2C illustrates an exemplary embodiment of the distributor shaft of FIG. 2A, in accordance with the present disclosure.

FIG. 2C illustrates an exemplary embodiment of the distributor shaft of FIG. 2A, in accordance with the present disclosure.

Figure 3A:
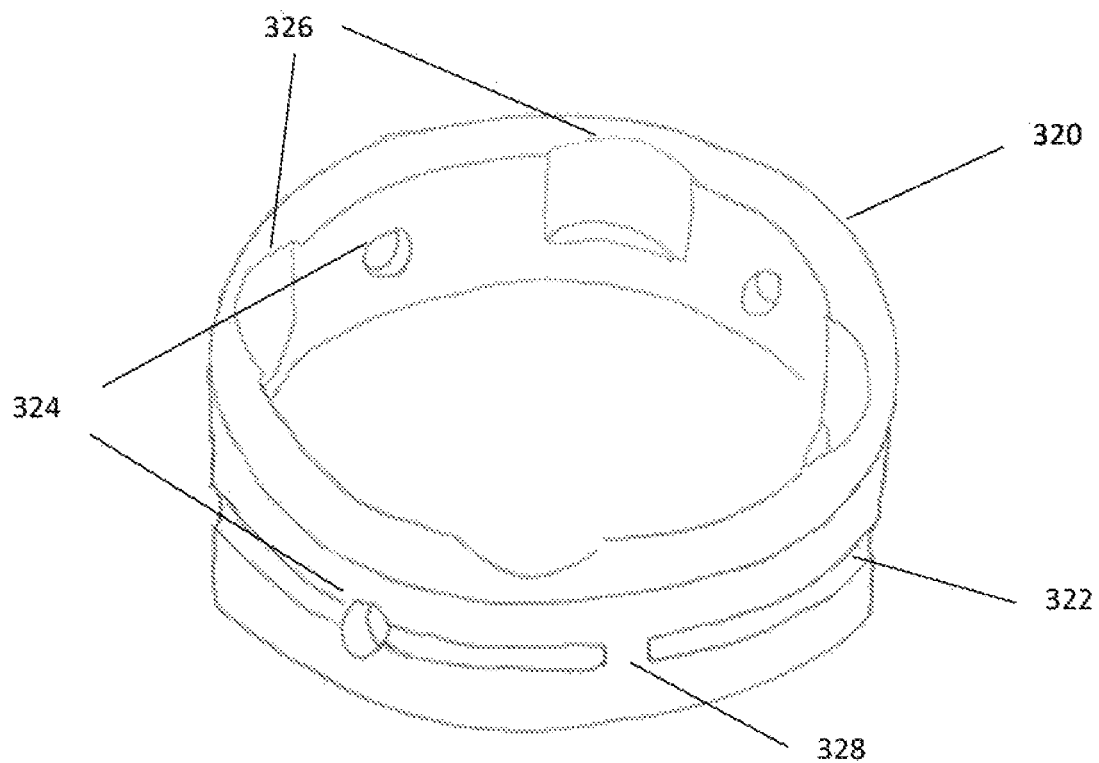
FIG. 3A illustrates an exemplary supply control ring portion of the hydraulic actuator of FIG. 1, in accordance with the present disclosure.

FIG. 3A illustrates an exemplary supply control ring portion of the hydraulic distributor of FIG. 1, in accordance with the present disclosure. Supply control ring 320 includes a communication groove 322 traveling around some portion of the circumference of control ring 320 and includes at least one vent hole 324. Rotational alignment of hole 302 with hole 324 determines an opening of the attached engine valve. Optional bleed scallops 326 are illustrated enabling rapid changing of oil pressure within the control ring. Groove 322 is not continuous, and includes groove breaks 328. Groove breaks 328 are spaces with a surface even with the rest of the widest radius of the control ring preventing oil flow from one groove 322 to a next groove 322. According to one embodiment, four groove breaks at approximately 90 degrees from each other are utilized. If additional angular capability is required, the number of segments would need to be reduced to 3 or less and additional rows would need to be added to accommodate greater cylinder counts.

Figure 3B:
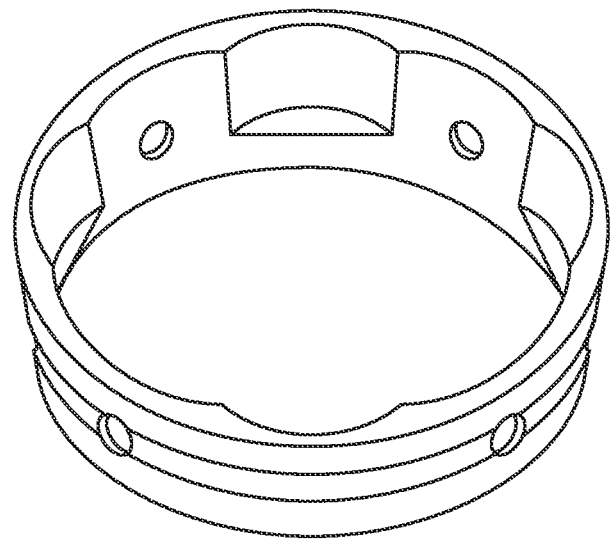
FIG. 3B illustrates an exemplary embodiment of the supply control ring of FIG. 3A, in accordance with the present disclosure.

FIG. 3B illustrates an exemplary embodiment of the supply control ring of FIG. 3A, in accordance with the present disclosure.

Figure 4A:
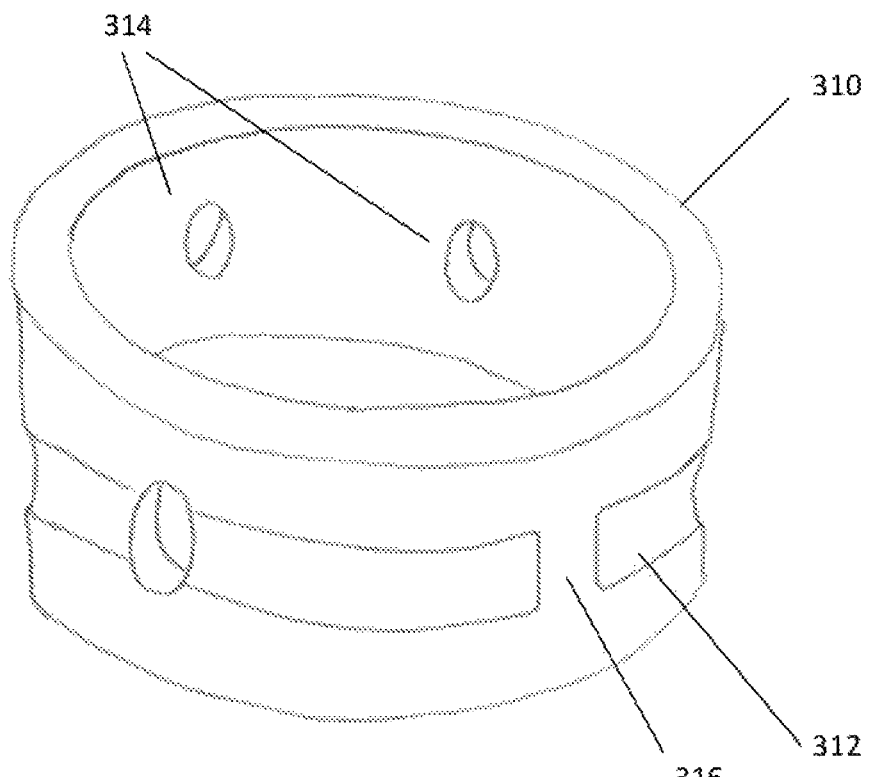
FIG. 4A illustrates an exemplary return control ring portion of the hydraulic distributor of FIG. 1, in accordance with the present disclosure.

FIG. 4A illustrates an exemplary return control ring portion of the hydraulic distributor of FIG. 1, in accordance with the present disclosure. Return control ring 310 includes a communication groove 312 traveling around some portion of the circumference of control ring 310 and includes at least one vent hole 314. Rotational alignment of hole 304 with hole 314 determines an opening of the attached engine valve. Groove 312 is not continuous, and includes groove breaks 316. Groove breaks 316 are spaces with a surface even with the rest of the widest radius of the control ring preventing oil flow from one groove 312 to a next groove 312. According to one embodiment, four groove breaks at approximately 90 degrees from each other are utilized.

Figure 4B:
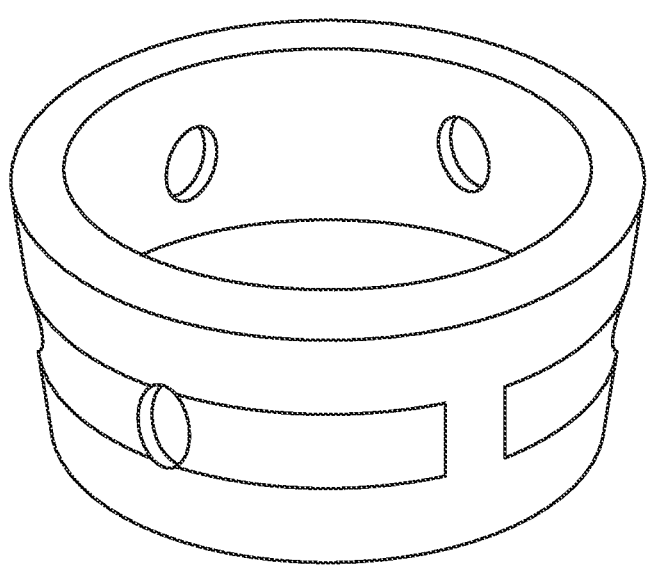
FIG. 4B illustrates an exemplary embodiment of the supply control ring of FIG. 4A, in accordance with the present disclosure.

FIG. 4B illustrates an exemplary embodiment of the supply control ring of FIG. 4A, in accordance with the present disclosure.

The grooves in the control rings have the oil holes in the center of the groove but the actual position would be determined by the desired valve opening and closing range. The radial drillings in the aluminum part would provide the oil supply and drainage with one being hydraulically connected to the supply side of the pump and one to the return side of the pump. Adjacent holes in the housing would be connected by a T-piece and would communicate through a single hydraulic line for each intake or exhaust valve. The function of this T-piece can also be accomplished with drillings in the hydraulic distributor body.

Each valve would have a hydraulic actuator. In one exemplary configuration, the actuators would be two stage. In other embodiments, the actuators can include three or more stages. The large piston portion can be approximately 5 times the size of the smaller one to provide the high force required for opening and to reduce the closing velocity when the valve is close to the seat. The large piston portion can be a very small portion of the total stroke. The hydraulic actuators can also incorporate valve lash adjustment.

Hydraulic actuators of the disclosed camless system can provide full range of air flow needs for a diesel engine. Hydraulic actuators can provide optimized air flow for cold starts, full range of Miller timing with fast closing to minimize pumping losses with aggressive Miller timing, an ability to immediately switch from Miller timing to maximized performance mode. Hydraulic actuators can provide low parasitic losses at most operating modes and can incorporate cylinder deactivation in an internal combustion engine if desired.

This camless system offers desirable flexibility with a robust system. One exemplary embodiment of the camless system will provide a fuel economy advantage over variable valve trains (approximately 5 to 12% depending on the system replaced). System simplicity reduces cost and makes it cost competitive with production variable valve train systems. System parasitic power is on parity with conventional valvetrains. Weight can be comparable to conventional valvetrains. Valve cover will be a quiet area which will help reduce oil consumption. Cylinder head design is simplified. This System is fully scalable from engine sizes of less than 1 to 200 plus liters. This system can provide engine braking without the noise level of a Jacobs brake.

Figure 5:
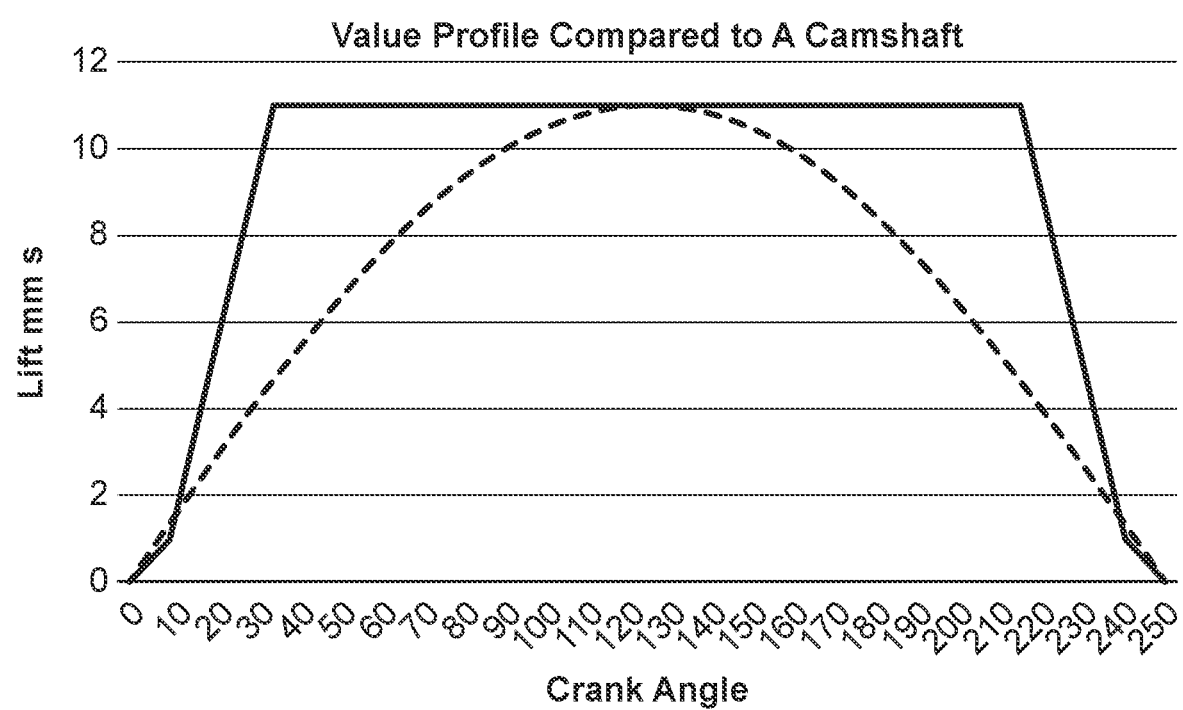
FIG. 5 graphically illustrates exemplary flow area realized with a camless valve control system as compared to a known camshaft valve control system, in accordance with the present disclosure.

FIG. 5 graphically illustrates exemplary flow area realized with a camless valve control system as compared to a known camshaft valve control system, in accordance with the present disclosure. The red arrow illustrates the profile associated with the disclosed system.

Figure 6:
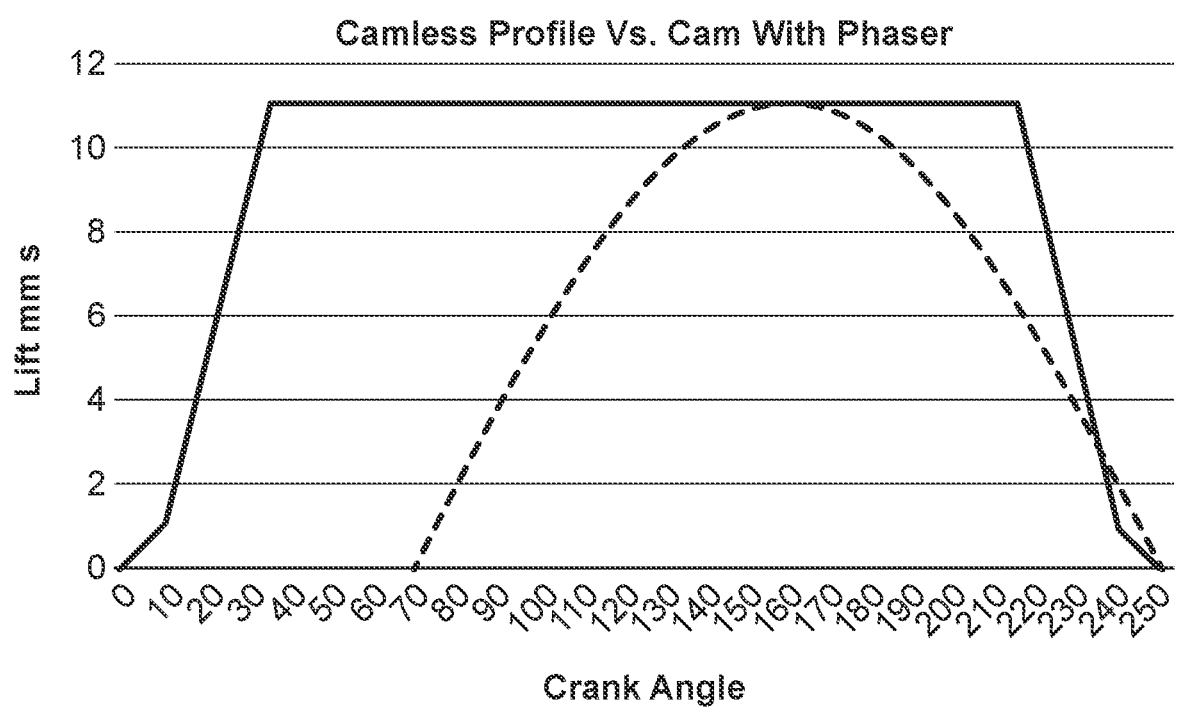
FIG. 6 graphically illustrates valve lift as a function of crank angle for an exemplary camless valve control system as compared to a known camshaft valve control system, in accordance with the present disclosure.

FIG. 6 graphically illustrates valve lift as a function of crank angle for an exemplary camless valve control system as compared to a known camshaft valve control system, in accordance with the present disclosure. The red arrow illustrates the profile associated with the disclosed system.

FIG. 7 graphically illustrates improved control of an exemplary intake valve during an intake throttling event, enabling the system to incur minimized pumping losses as compared to a known camshaft controlled system, in accordance with the present disclosure. The red arrow illustrates the profile associated with the disclosed system.

Figure 8:
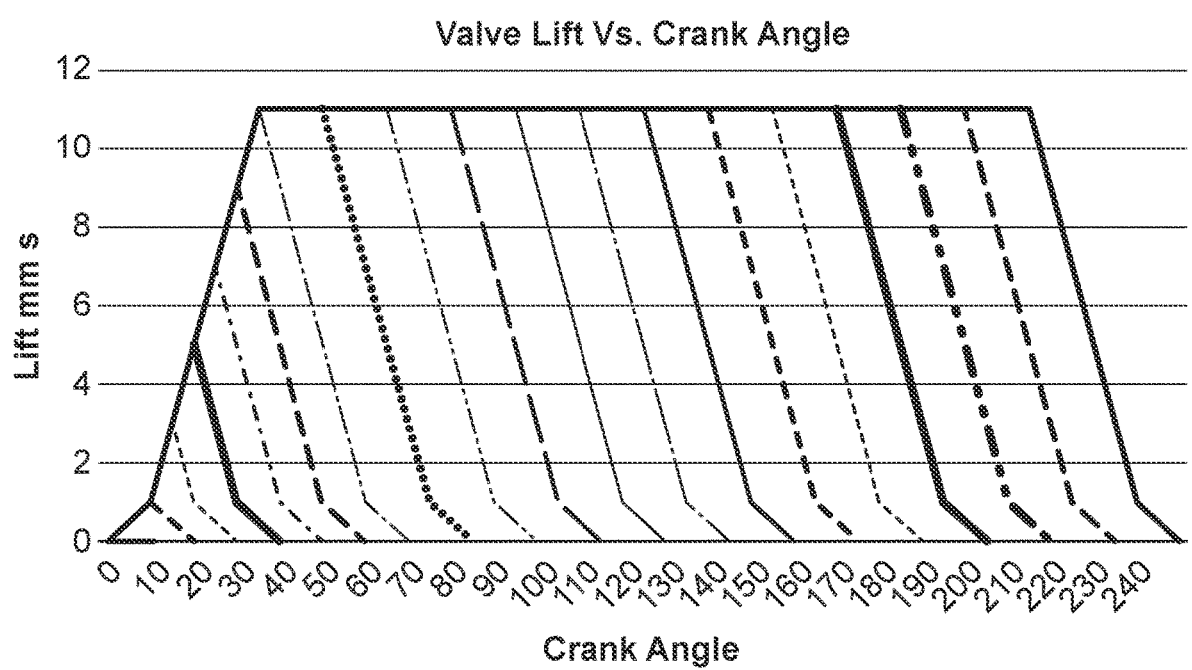
FIG. 8 graphically illustrates various intake valve control profiles enabled by the camless valve control system, in accordance with the present disclosure.

FIG. 8 graphically illustrates various intake valve control profiles enabled by the camless valve control system, in accordance with the present disclosure. The various plots show how the timing of the valve closing can be freely adjusted through adjustment of the associated return control ring.

Figure 9:
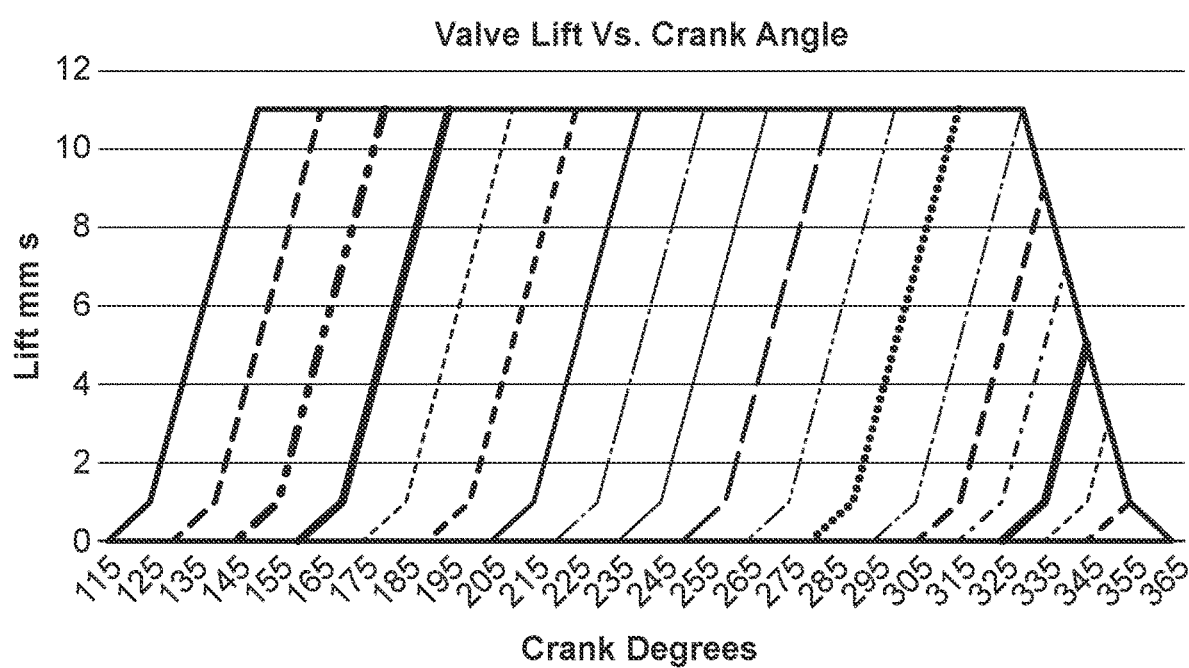
FIG. 9 graphically illustrates various exhaust valve control profiles enabled by the camless valve control system, in accordance with the present disclosure.

FIG. 9 graphically illustrates various exhaust valve control profiles enabled by the camless valve control system, in accordance with the present disclosure. The various plots show how the timing of the valve opening can be freely adjusted through adjustment of the associated supply control ring.

Figure 10:
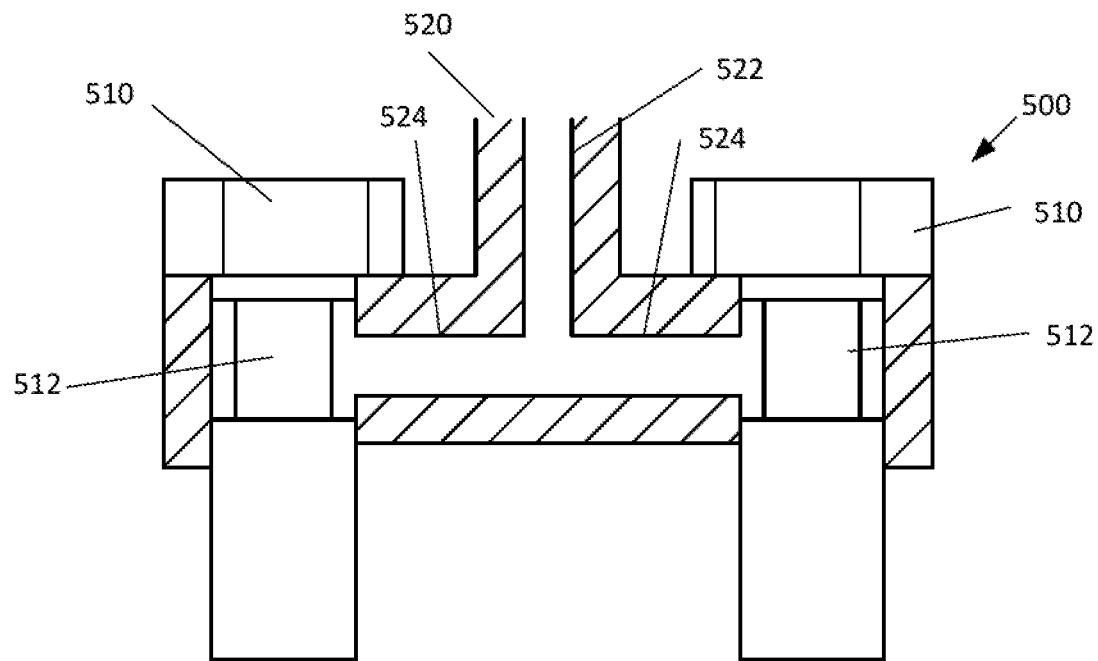
FIG. 10 illustrates exemplary connection of a T-connection to two banjo bolts, the illustrated configuration useful for connecting the pump of the disclosure to a hydraulic actuator, in accordance with the present disclosure. Internal drillings in the hydraulic distributor housing can also be used to achieve this function.

FIG. 10 illustrates exemplary connection of a T-connection to two banjo bolts, the illustrated configuration useful for connecting the hydraulic distributor of the disclosure to a hydraulic actuator, in accordance with the present disclosure. Exemplary banjo bolts 510 are illustrated including hydraulic passages 512, mechanisms known in the art for connecting a hydraulic circuit and providing hydraulic fluid to and from a device. T-connection 520 is illustrated fluidly connecting a hydraulic circuit portion 522 and the banjo bolts 510. The central portion extending upward is a control circuit path to the engine valves. One of the banjo bolts provides pressurized fluid from the pump, and the other the banjo bolts releases the pressurized fluid back to the pump. The configuration of FIG. 10 is one exemplary, non-limiting way to use the disclosed hydraulic distributor configuration of FIG. 1A.

Figure 11:
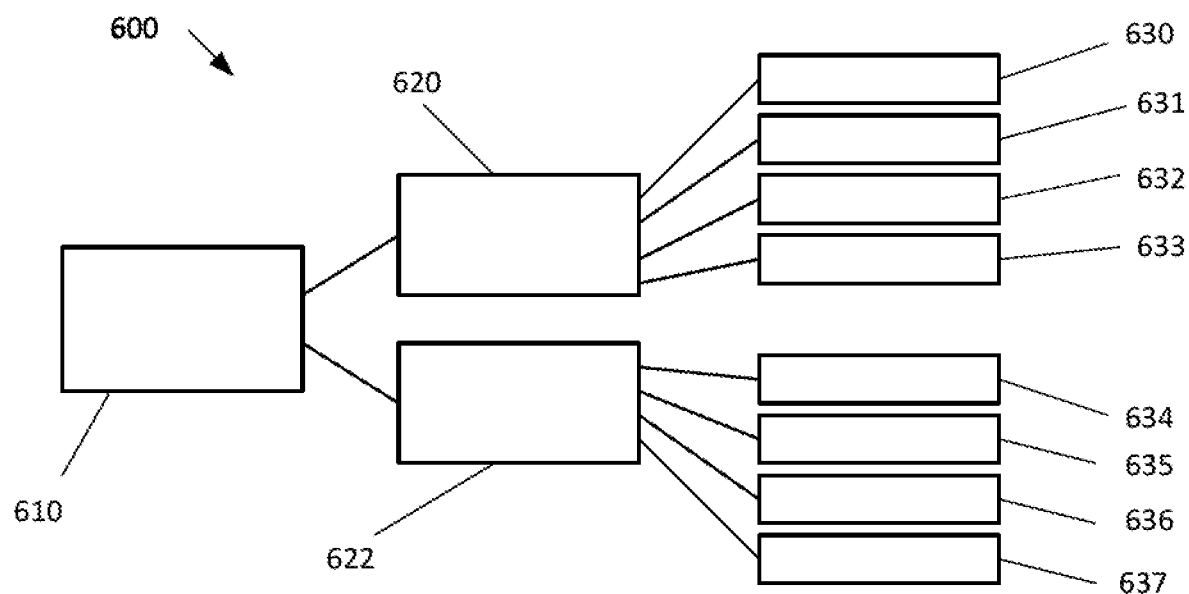
FIG. 11 illustrates schematically distribution of hydraulic control fluid from the hydraulic pump of FIG. 1, in accordance with the present disclosure.

FIG. 11 illustrates schematically distribution of hydraulic control fluid from the hydraulic pump of FIG. 1, in accordance with the present disclosure. System 600 is illustrated. Hydraulic pump portion 610 supplies and receives return oil from a first oil distribution system 620, including one or more hydraulic distributor bodies and associated control rings, and from a second oil distribution system 622, including one or more pump bodies and associated control rings. Four intake valves 630, 631, 632, and 633 are illustrated, one for each cylinder of an exemplary 4-cylinder engine, and four exhaust valves 634, 635, 636, and 637 are illustrated, also one for each cylinder.

Figure 12:
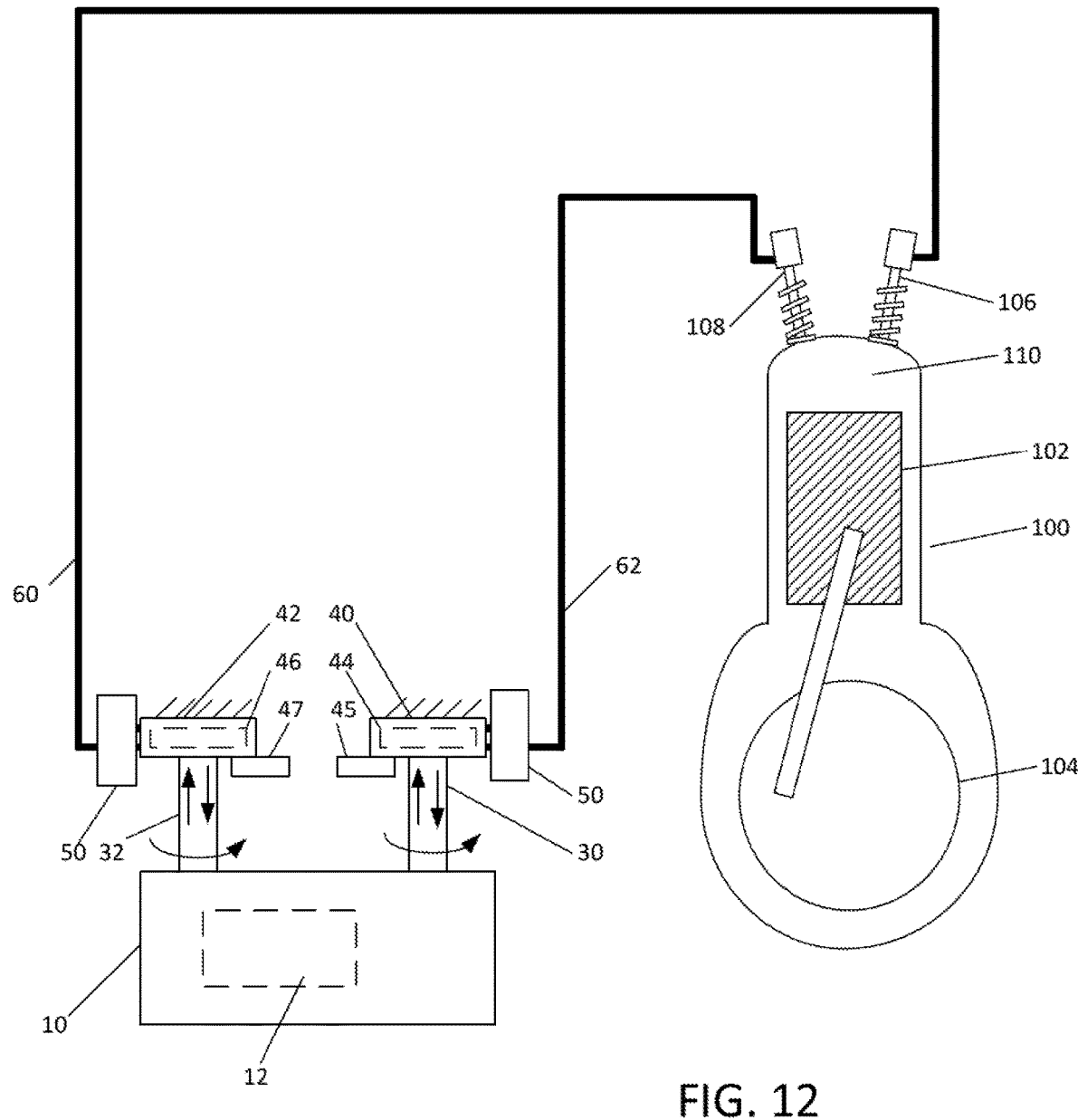
FIG. 12 illustrates an exemplary engine system controlled by a first exemplary camless valve control system, with rotation of a shaft of a hydraulic distributor controlling rotation of cylindrical distributor bodies in relation to static control rings for each of the pump bodies, the relative rotation controlling hydraulic pressures within a control circuit to control engine cylinder valves, in accordance with the present disclosure.

FIG. 12 illustrates an exemplary engine system controlled by a first exemplary camless valve control system, with rotation of a shaft of a hydraulic distributor device controlling rotation of cylindrical pump bodies in relation to static control rings for each of the hydraulic distributor bodies, the relative rotation controlling hydraulic pressures within a control circuit to control engine cylinder valves, in accordance with the present disclosure. Engine 100 is illustrated including a piston 102, a crankshaft 104, a hydraulically controlled intake valve 108, a hydraulically controlled exhaust valve 106, and a cylinder head space 110.

Camless system 10 is illustrated including the hydraulic distributor device 12 which receives mechanical power through a timing attached to engine 100 and supplies pressurized oil to the disclosed system. Pump chain device 12 also supplies mechanical torque to each of pump and distributor body 30 controlling intake valve 108 and pump body 32 controlling exhaust valve 106. Distributor housing 40 is illustrated containing one or more control rings 44 in fluid contact with pump body 30. Distributor housing 42 is illustrated containing one or more control rings 46 in fluid contact with pump body 32. Banjo bolt and T valve connections 50 are each illustrated attached to distributor housings 40 and 42. Electric servo motor 45 is illustrated attached to housing 40, permitting computerized control of each of the control rings 44 within housing 40. Electric servo motor 47 is illustrated attached to housing 42, permitting computerized control of each of the control rings 46 within housing 42. Hydraulic control circuit 60 fluidly connects the control system to exhaust valve 106, and hydraulic control circuit 62 fluidly connects the control system to exhaust valve 108.

Figure 13:
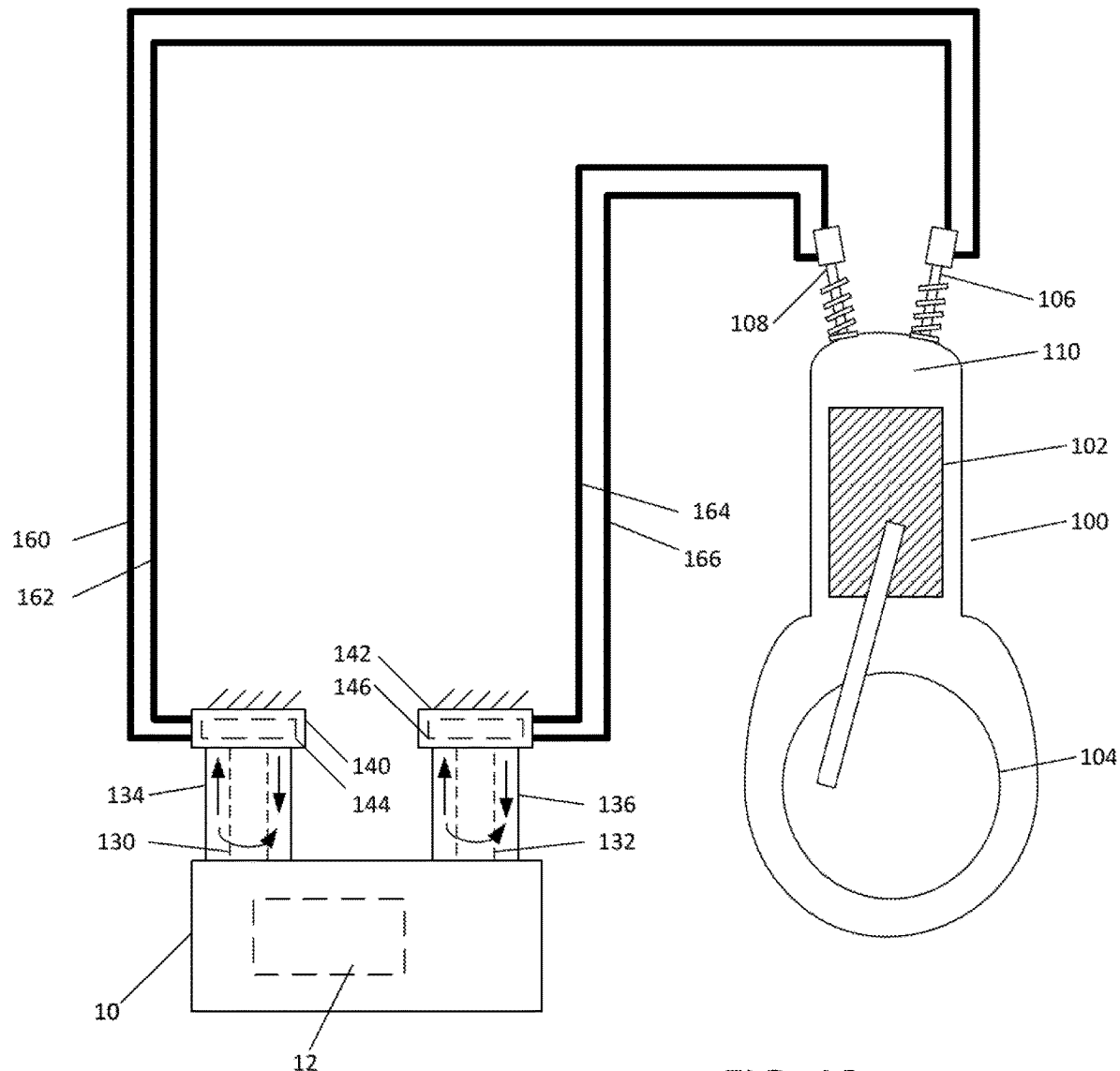
FIG. 13 illustrates an exemplary engine system controlled by an alternative exemplary camless valve control system, in accordance with the present disclosure.

FIG. 13 illustrates an exemplary engine system controlled by an alternative exemplary camless valve control system, in accordance with the present disclosure. Engine 100 is illustrated including a piston 102, a crankshaft 104, a hydraulically controlled intake valve 108, a hydraulically controlled exhaust valve 106, and a cylinder head space 110.

Camless actuation system 10 is illustrated including hydraulic distributor device 12 which receives mechanical power through a timing chain attached to engine 100 and supplies pressurized oil to the disclosed system. Hydraulic distributor device 12 also supplies mechanical torque to each of pump body 130 controlling exhaust valve 106 and pump body 132 controlling intake valve 108. Distributor housing upper portion 140 is illustrated containing one or more control rings 144 in fluid contact with pump body 130. Distributor housing lower portion 134 is illustrated containing pump body 130. Distributor housing 142 is illustrated containing one or more control rings 146 in fluid contact with pump body 132. Distributor housing lower portion 136 is illustrated containing pump body 132. Distributor bodies 130 and 132 can include internal passages to conduct oil to and from the control rings. In addition, housing lower portions 134 and 136 can optionally be configured with passages to also or alternatively conduct oil. Instead of utilizing banjo bolt and T valve connections, the embodiment of FIG. 13 illustrates separate supply hydraulic lines 160 and 166 and separate return hydraulic lines 162 and 164. Control rings 144 and 146 are illustrated as optionally fixed control rings, with no mechanism for timing adjustments.

Figure 14:
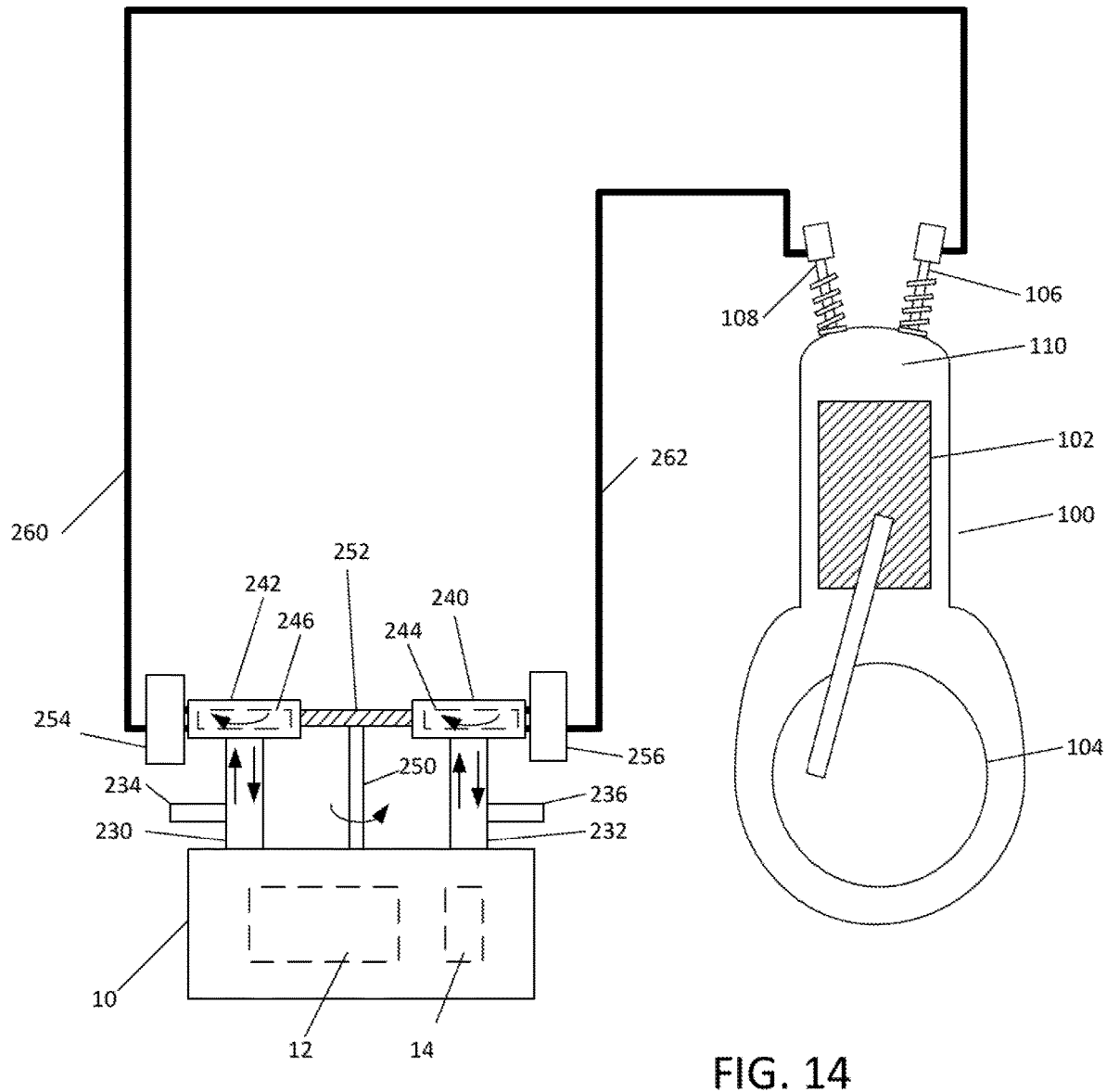
FIG. 14 illustrates an exemplary engine system controlled by an additional alternative exemplary camless valve control system, in accordance with the present disclosure.

FIG. 14 illustrates an exemplary engine system controlled by an additional alternative exemplary camless valve control system, in accordance with the present disclosure. Engine 100 is illustrated including a piston 102, a crankshaft 104, a hydraulically controlled intake valve 108, a hydraulically controlled exhaust valve 106, and a cylinder head space 110.

Hydraulic distributor system 10 is illustrated including hydraulic distributor device 12 which receives mechanical power through a timing chain attached to engine 100 and supplies pressurized oil to the disclosed system. Hydraulic distributor system 10 further includes a computerized control module 14, including programming configured to control timing adjustments in accordance with the disclosure. In FIGS. 12 and 13, hydraulic distributor shafts are illustrated configured to constantly rotate in timing with the engine. In the embodiment of FIG. 14, an alternative configuration is illustrated where the control rings 246 and 244 are configured to constantly rotate and the pump bodies 230 and 232 are configured to remain essentially static, with only timing changes controlled by servo motors 234 and 236, respectively. Pump device 12 supplies mechanical torque to each of control rings 246 and 244. Actuator housing 240 is illustrated containing one or more control rings 244 in fluid contact with pump body 232. Actuator housing 242 is illustrated containing one or more control rings 246 in fluid contact with pump body 230. Banjo bolt and T valve connections 254 and 256 are each illustrated attached to actuator housings 242 and 240, respectively. Hydraulic control circuit 260 fluidly connects the control system to exhaust valve 108. Hydraulic control circuit 262 fluidly connects the control system to exhaust valve 108.

A number of alternative system configurations to the embodiments of FIGS. 12-14 are envisioned, and the disclosure is not intended to be limited to the particular examples provided herein.

Figure 15:
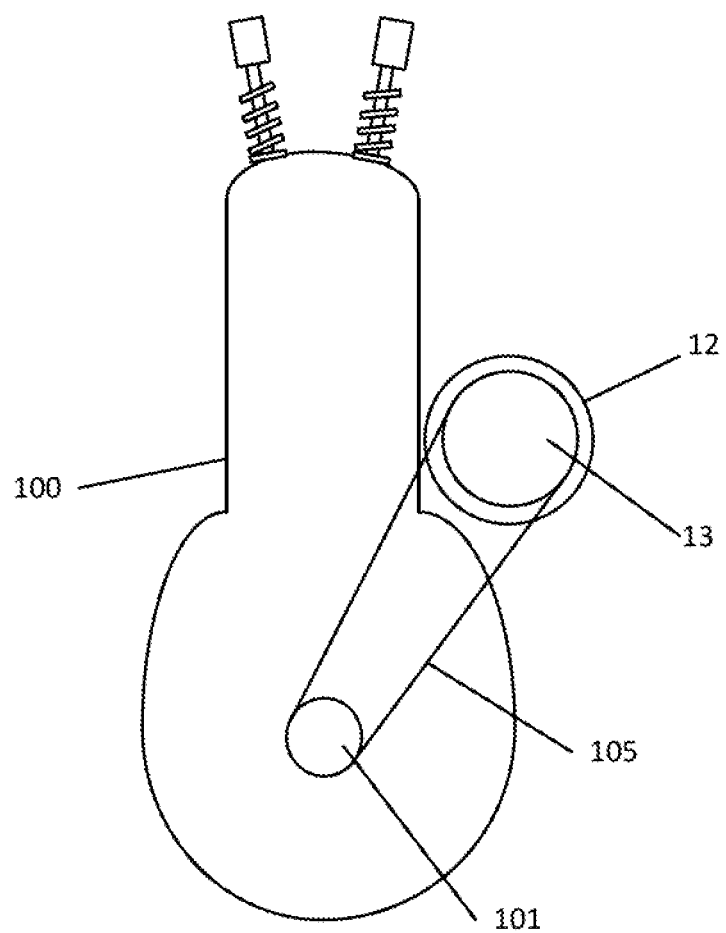
FIG. 15 illustrates an exemplary engine system connected to a hydraulic pump device of the disclosed system with a timing chain, in accordance with the present disclosure.

FIG. 15 illustrates an exemplary engine system connected to a hydraulic pump device of the disclosed system with a timing chain, in accordance with the present disclosure. Engine 100 is illustrated including an output shaft wheel 101. Hydraulic pump device 12 is illustrated including an input shaft wheel 13. In one embodiment, wheel 101 and wheel 13 are each sized to ensure that wheel 13 turns once for every two turns of wheel 101. Wheel 101 is connected to wheel 13 through timing chain 105 which engages to timing teeth on each of wheels 101 and wheel 13 to ensure that precise timing is maintained between the two wheels. Timing chain 105 is one way to mechanically drive pump device 12 accurately in time with engine 100. It will be appreciated that gears with intermeshed teeth can similarly be utilized to mechanically connect pump device 12 and engine 100.

Figure 16:
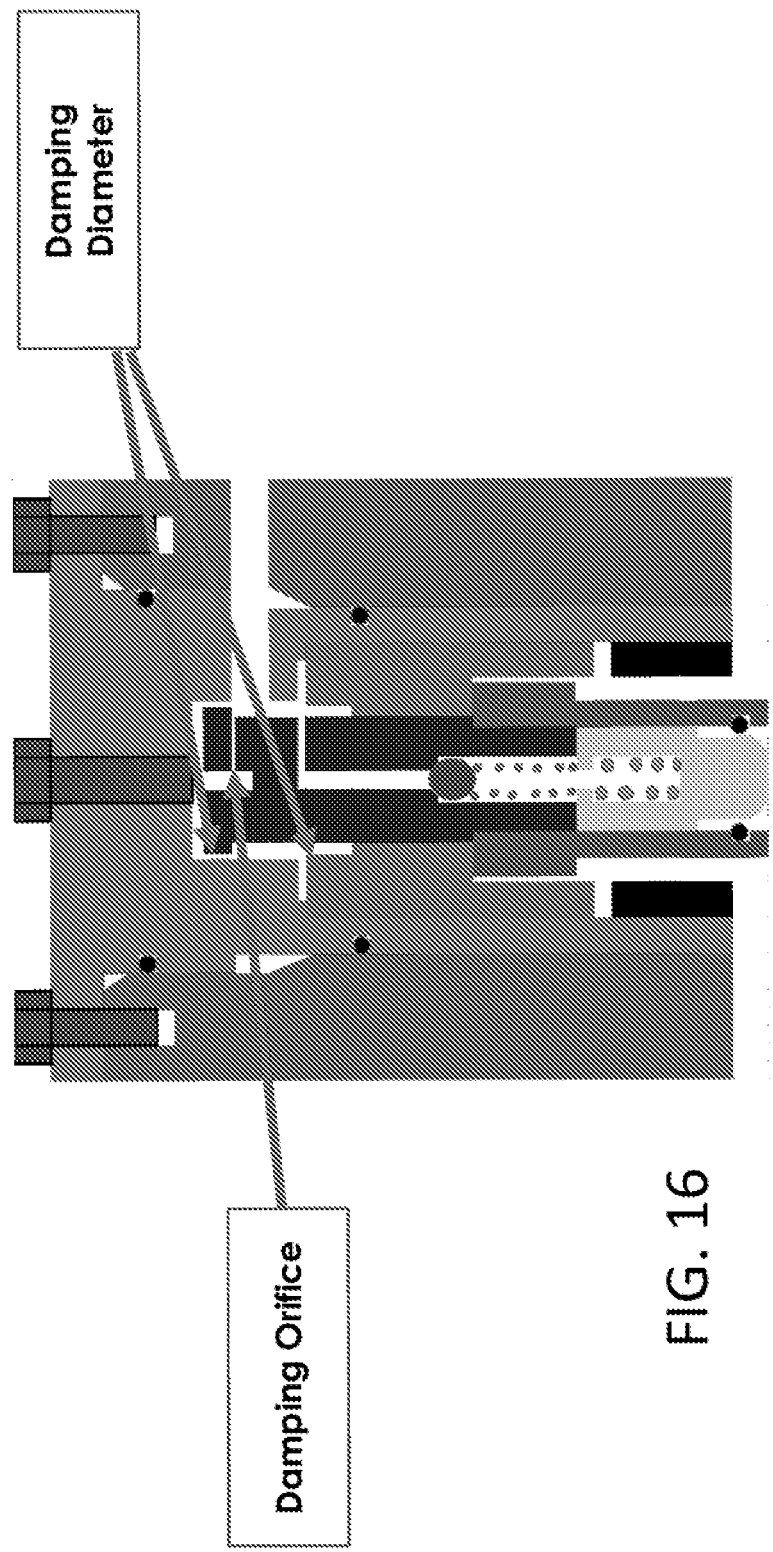
FIG. 16 illustrates an exemplary hydraulic actuator similar to the hydraulic actuator of FIG. 1, with an optional dampening orifice useful in controlling hydraulic control pressures, in accordance with the present disclosure.

FIG. 16 illustrates an exemplary hydraulic actuator similar to the hydraulic actuator of FIG. 1, with an optional dampening orifice useful in controlling hydraulic control pressures, in accordance with the present disclosure.

Figure 17:
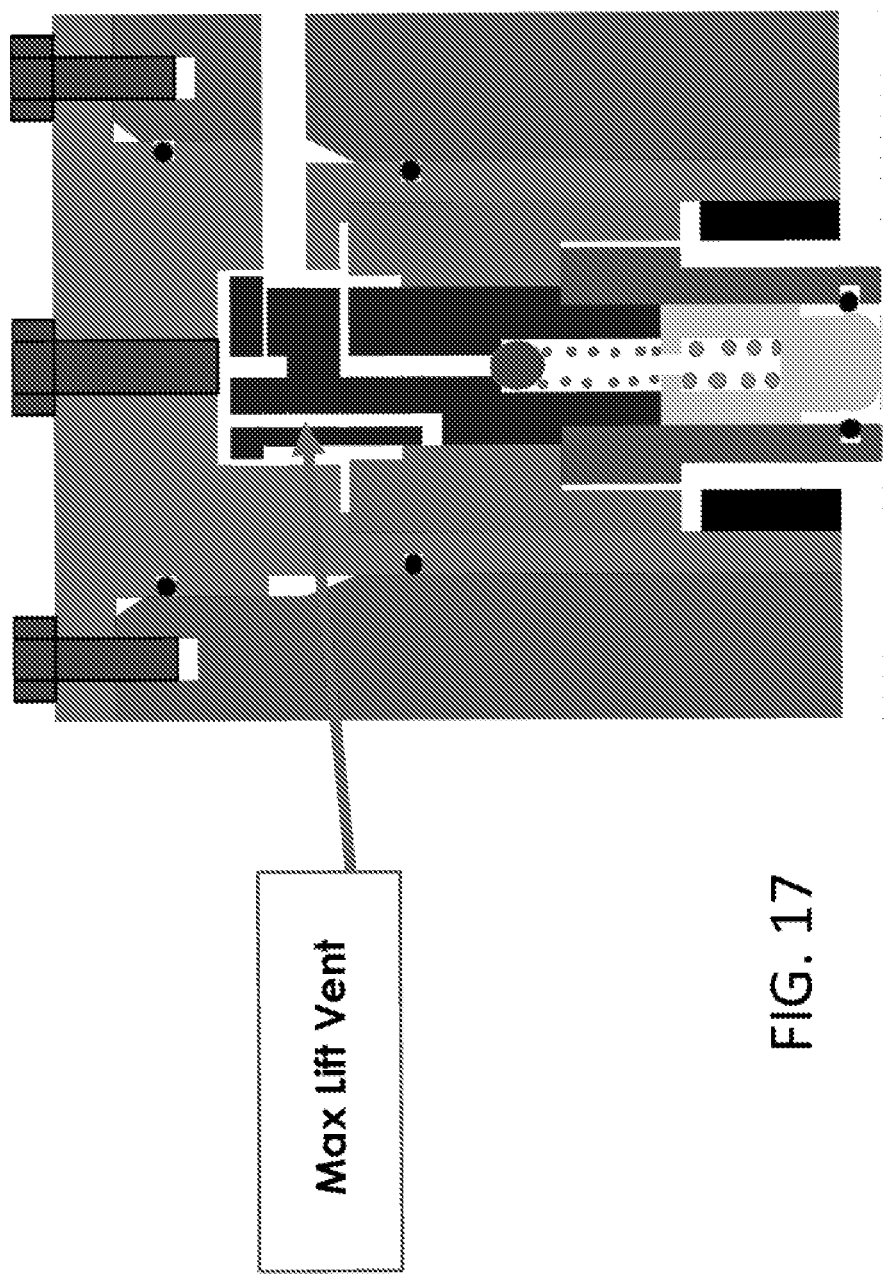
FIG. 17 illustrates the hydraulic actuator including a maximum lift vent, in accordance with the present disclosure.

FIG. 17 illustrates the hydraulic actuator including a maximum lift vent, in accordance with the present disclosure.

FIGS. 18A and 18B illustrate components of an alternative exemplary rotating distributor shaft 700 useful to control engine intake and exhaust valves, in accordance with the present disclosure. An exemplary distributor shaft 700 is illustrated in a perspective view in FIG. 18A and a front view in FIG. 18B. FIGS. 18C and 18D show an exemplary internal flow dividing plug 720 including a plurality of o-rings 722. FIG. 18C shows the exemplary flow dividing plug 720 in a perspective view, while FIG. 18D shows an exemplary front view. The distributor shaft 700 includes a plurality of holes 702 and grooves 704 configured to control a flow a hydraulic fluid to and from the distributor shaft 700 as the distributor shaft 700 is spun. The internal flow dividing plug 720 fits within the distributor shaft 700. The distributor shaft 700 can be fit with a stationary housing, and the stationary housing can include a plurality of holes or ports useful to channel hydraulic fluid to and from the distributor shaft 700 for the purposes of controlling the flow of hydraulic fluid. The rotation of the distributor shaft 700 is useful to providing cyclic control, for example, as described herein, in relation to controlling intake and exhaust valves for an internal combustion engine. In one embodiment, the exemplary flow dividing plug 720 channels internal hydraulic flow to first and second portions of the rotating distributor shaft 700, the portions being defined by a center line in the middle of the shaft 700 and/or the plug 720.

Figure 19A:
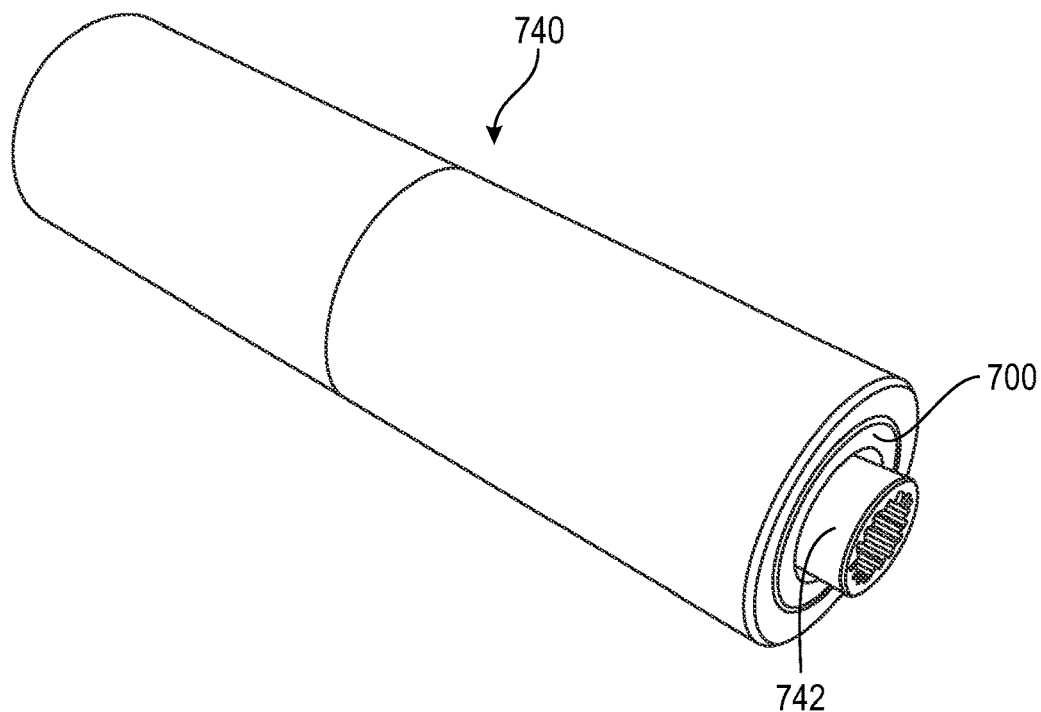
FIGS. 19A and 19B illustrates the components of FIGS. 18A and 18B fit within an exemplary stationary housing, in accordance with the present disclosure.
Figure 19B:
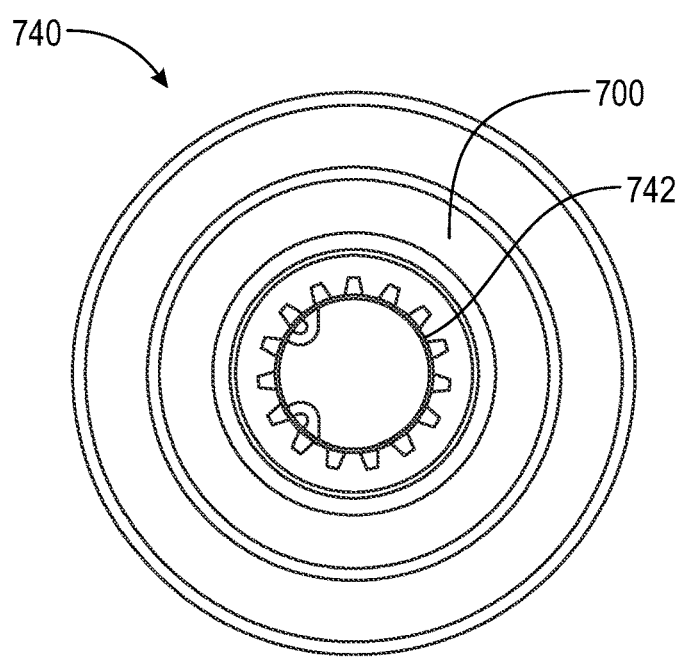

FIGS. 19A and 19B shows a stationary housing 740. The distributor shaft 700 and flow dividing plug 720 fit within an exemplary stationary housing 740. The stationary housing 740 can include ports at different locations based upon providing cyclical access to holes or slots in the distributor shaft 700 as it spins. A snap ring 742 is illustrated fit to an end of the distributor shaft 700 in order to affix an internal flow dividing plug 720 within the distributor shaft 700. The stationary housing 740 is provided only as an illustrative part or portion of an overall housing to show the distributor shaft 700 inserted within a housing. See FIG. 25 for two further exemplary views of an exemplary housing.

Figure 20A:
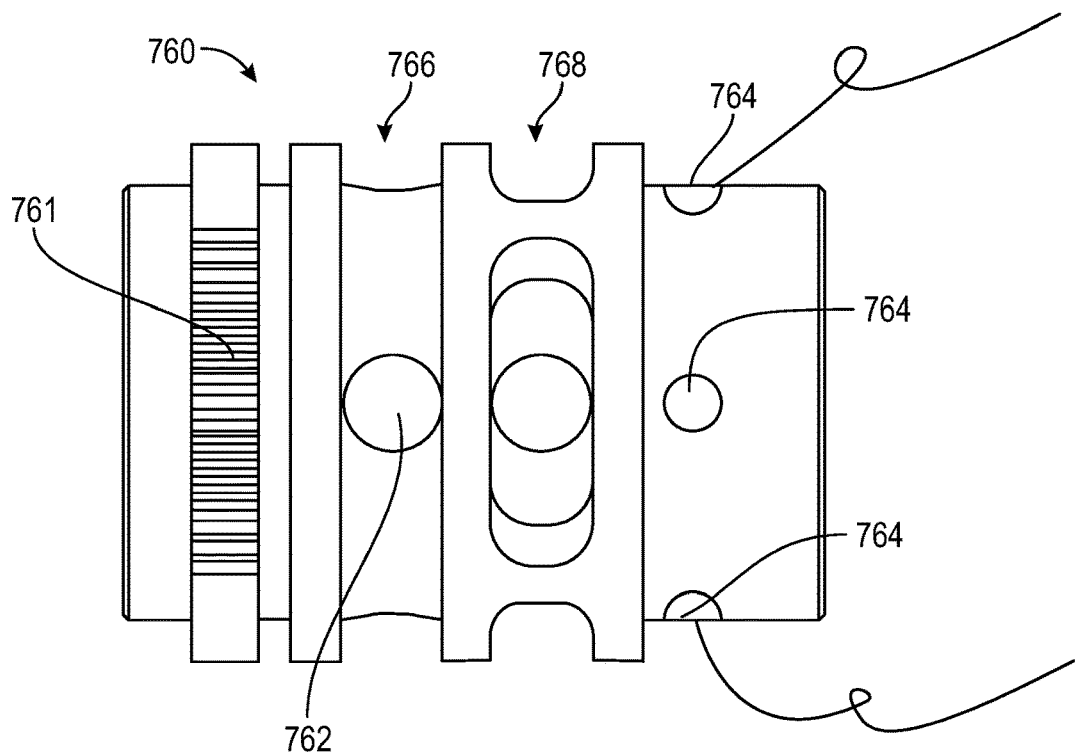
FIGS. 20A-20B illustrate an exemplary opening control ring, in accordance with the present disclosure.
Figure 20B:
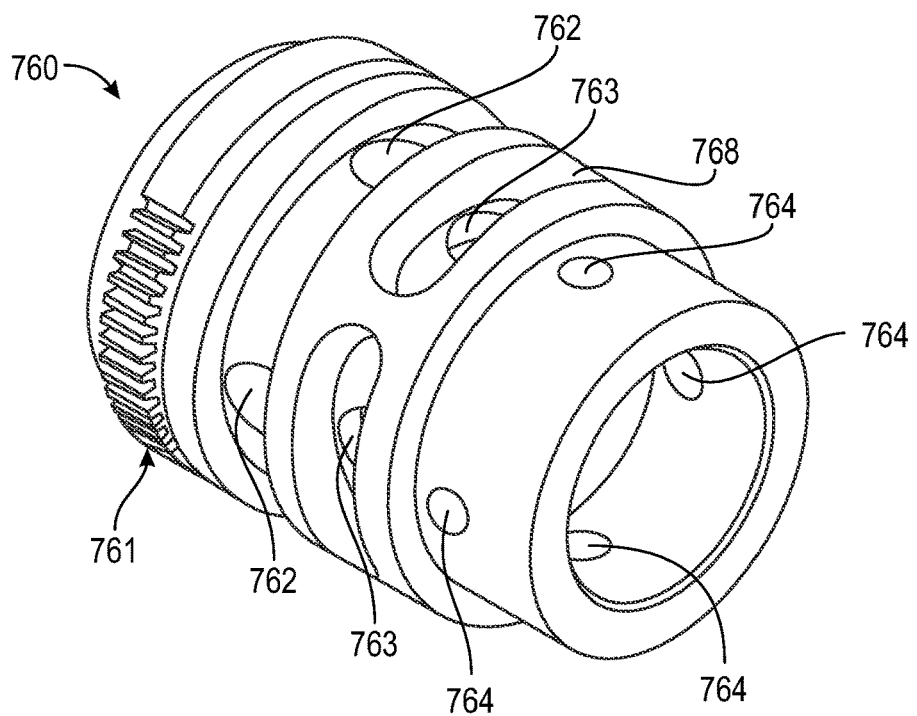

FIGS. 20A and 20B show an exemplary opening control ring 760. The opening control ring 760 is stationary and located co-axially with the distributor shaft 700 when assembled, so as to fit around the distributor shaft 700, with holes 762 of the opening control ring 760 aligning and misaligning with holes in the distributor shaft as the distributor shaft 700 turns. Location of the various holes upon each of the opening control ring 760 and the distributor shaft 700 control selective cyclical flow of hydraulic fluid from the device to the valves being controlled. Opening control rings 760 are used to open the valves being controlled. Spill ports 764 are pathways provided on a portion of a control ring that permit hydraulic fluid to spill or flow back to the pump inlet, releasing hydraulic pressure from the controlled valve circuit at desired times Timing, duration, and/or other parameters of operations controlled by the device can be modulated by selectively slightly turning the control ring 760 with respect to the housing 740 using gear teeth 761 and a servo motor, for example. The opening control ring 760 communicates the oil to open the valve at the desired time and also has a feature to spill oil at the end of the lift cycle. This feature is simpler to machine and has performance advantages over the earlier concept due to multiple spill ports opening simultaneously and providing a larger flow path to minimize restriction/pressure drop of the oil.

The opening control ring 760 includes a supply groove 766 having a radial distance on a top surface less than the surrounding surfaces and traverses, circumferentially, at least a portion of the circumference of the control ring 760. Within the supply groove there is at least one hole 762. As FIGS. 20A and 20B show, the supply groove 766 may traverse the entire circumference and have holes spaced every 90-degrees, although different groove lengths and number of holes are contemplated. Radial portion 768 includes a plurality of circumferential spaced distribution grooves, each distribution groove having a hole 763. Rotational alignment of hole 763 with holes on the distributor shaft 700 determines an opening of the attached engine valve. The plurality of circumferential spaced grooves 768 are not continuous, and includes groove breaks, which are preferably a radial distance of the top surface of the opening control ring 760. The groove breaks are spaces with a surface even with the rest of the widest radius of the control ring preventing oil flow from one groove to a next groove. According to one embodiment, four groove breaks at approximately 90 degrees from each other are utilized. If additional angular capability is required, the number of segments would need to be reduced to 3 or less and additional rows would need to be added to accommodate greater cylinder counts. The control rings 760 can have a series of circumferential grooves, separated by a short distance, communicating with the ports on the outside of the hydraulic distributor. With high cylinder counts that require a large amount of timing variation, a single grove may be replaced with two or more parallel grooves on the same control ring with the some of the ports being axially staggered to align with the additional groove(s). With this configuration, there can be multiple supply and drain ports to align with the additional grooves. The grooves can be in communication with the port that it is supplying hydraulic oil to or draining hydraulic oil from. Each of the grooves may have a single radial hole that communicates with the supply or drain port/ports on the hydraulic distributor. The ports to the engine valve actuators will be closed during valve dwell open or closed.

Figure 21A:
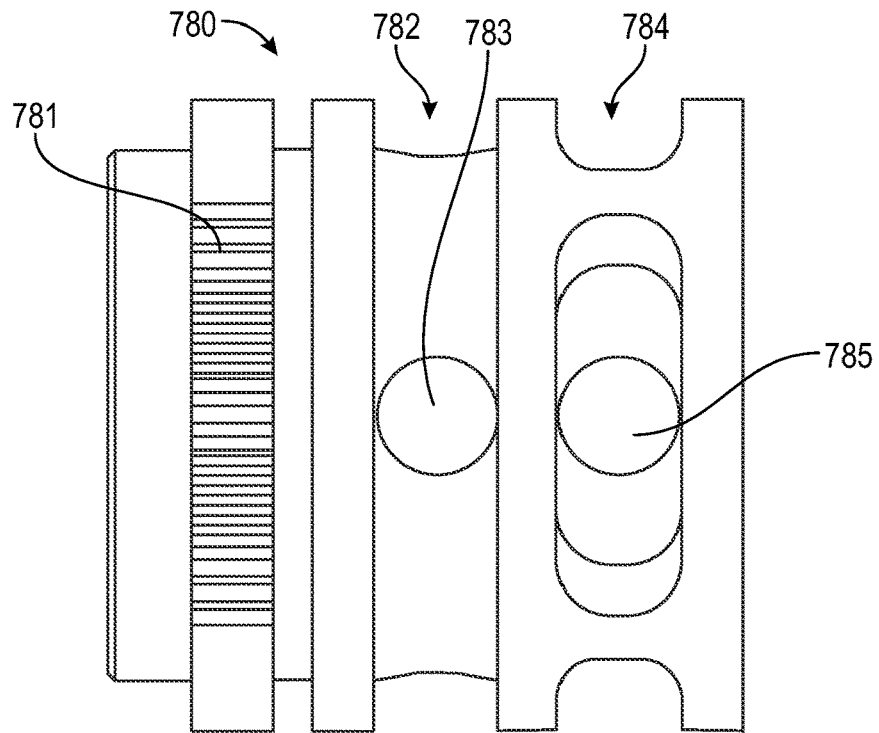
FIGS. 21A-21B illustrate an exemplary closing control ring, in accordance with the present disclosure.
Figure 21B:
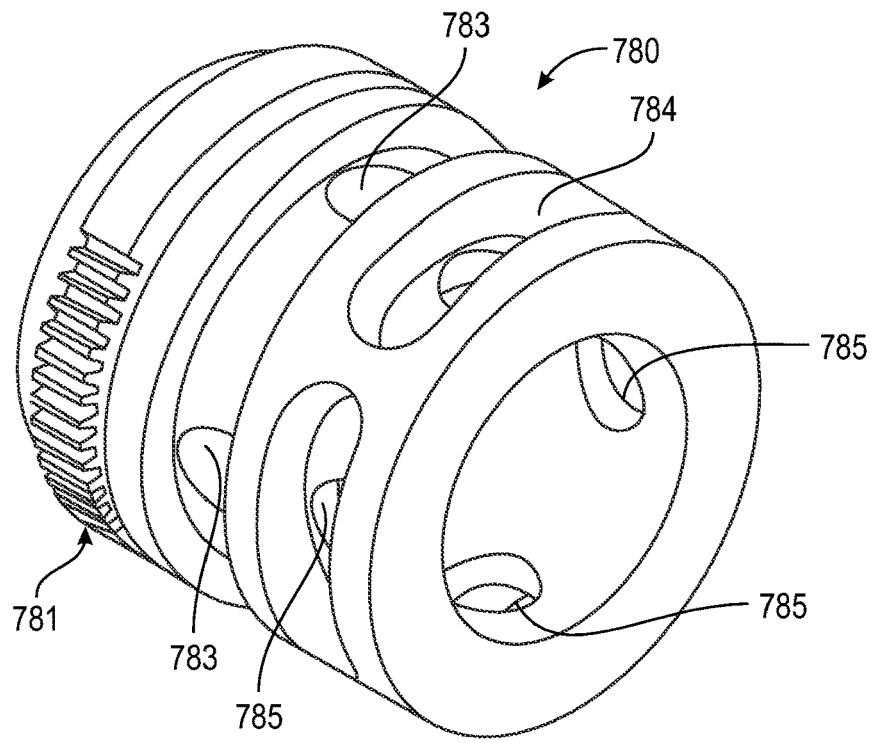

FIGS. 21A and 21B illustrates an exemplary closing control ring 780. Closing control rings 780 are similar to opening control rings of FIGS. 20A and 20B with the exception that closing control rings do not have a spill port and are utilized to selectively close the controlled valves. As FIGS. 21A and 21B show, the closing control rings 780 include a plurality of teeth 781 for engagement to a servo stepper motor to control intake valve actuation timing. The closing control rings 780 includes a supply groove 782 having a radial distance on a top surface less than the surrounding surfaces and traverses, circumferentially, at least a portion of the circumference of the closing control ring 780. Within the supply groove 782 there is at least one hole 783. As FIGS. 21A and 21B show, the supply groove 782 may traverse the entire circumference and have holes spaced every 90-degrees, although different groove lengths and number of holes are contemplated.

Like the opening control ring 760, the closing control ring 780 has a radial portion 784 that includes a plurality of circumferential spaced distribution grooves, each distribution groove having a hole 785. The plurality of circumferential spaced grooves are not continuous, and includes groove breaks, which are preferably a radial distance of the top surface of the closing control ring 780. The groove breaks are spaces with a surface even with the rest of the widest radius of the control ring preventing oil flow from one groove to a next groove. According to one embodiment, four groove breaks at approximately 90 degrees from each other are utilized. If additional angular capability is required, the number of segments would need to be reduced to 3 or less and additional rows would need to be added to accommodate greater cylinder counts.

Figure 22A:
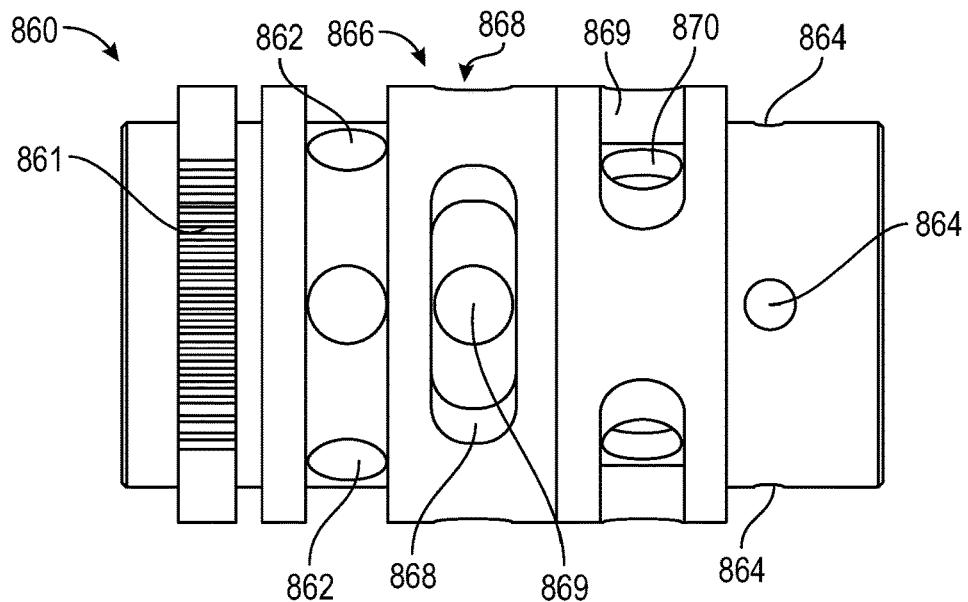
FIGS. 22A, 22B and 23A, and 23B illustrate exemplary opening and closing control rings, respectively, each with dual distribution grooves, enabling them to control multiple sets of valves (for example, for multiple cylinders) with a single control ring, in accordance with the present disclosure.
Figure 22B:
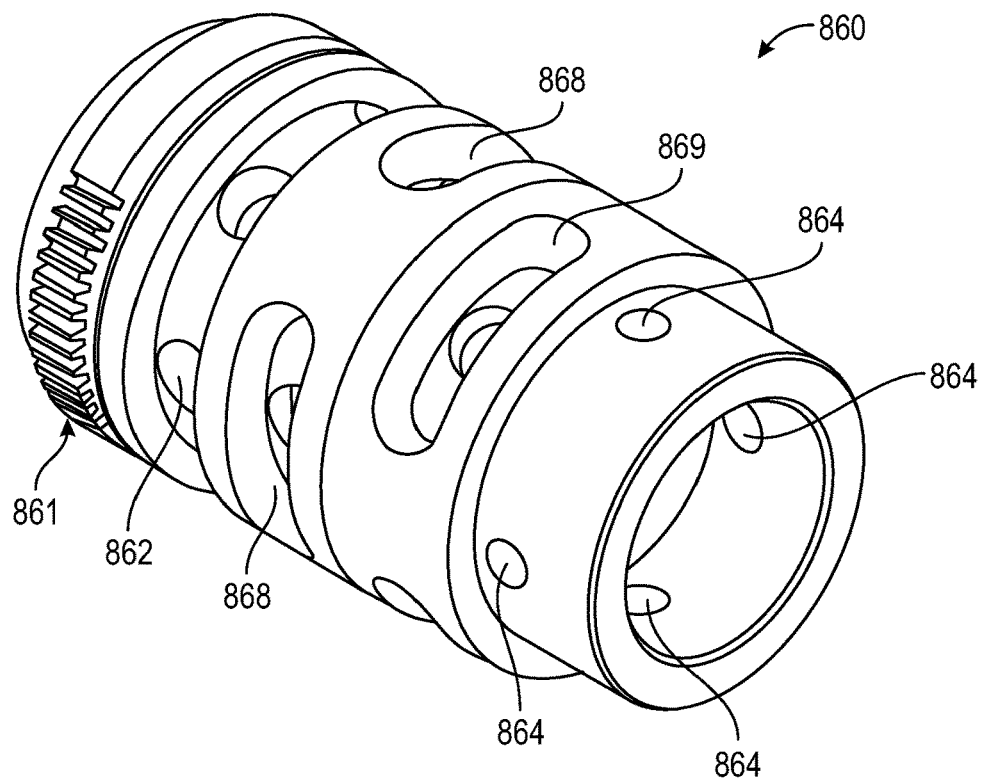

FIGS. 22A, 22B and 23A, and 23B illustrate exemplary opening and closing control rings 860 and 880, respectively, each with dual series of distribution grooves, enabling them to control multiple sets of valves (for example, for multiple cylinders) with a single control ring. As FIGS. 22A and 22B show, a second set of a plurality of circumferential spaced grooves 869 can be aligned at different crank-angles from the plurality of circumferential spaced grooves 868 to control timing and duration of lift events on the opening control rings 860. The grooves 868 and 869 each have a hole 869 and 870, respectively. The dual band of distribution grooves embodiment may still include the gear teeth 861, supply groove 866 and holes 862 and the spill holes 864, as the single band embodiment 760 described herein above.

As and 23A, and 23B show, a second set of a plurality of circumferential spaced grooves 886 can be aligned at different crank-angles from the plurality of circumferential spaced grooves 884 to control timing and duration of closing events on the closing control rings 880. The grooves 886 each have a hole 887. The dual band of distribution grooves embodiment may still include the gear teeth 881, the supply groove 882 and holes 883, as the single band embodiment 760 described herein above.

Figure 22C:
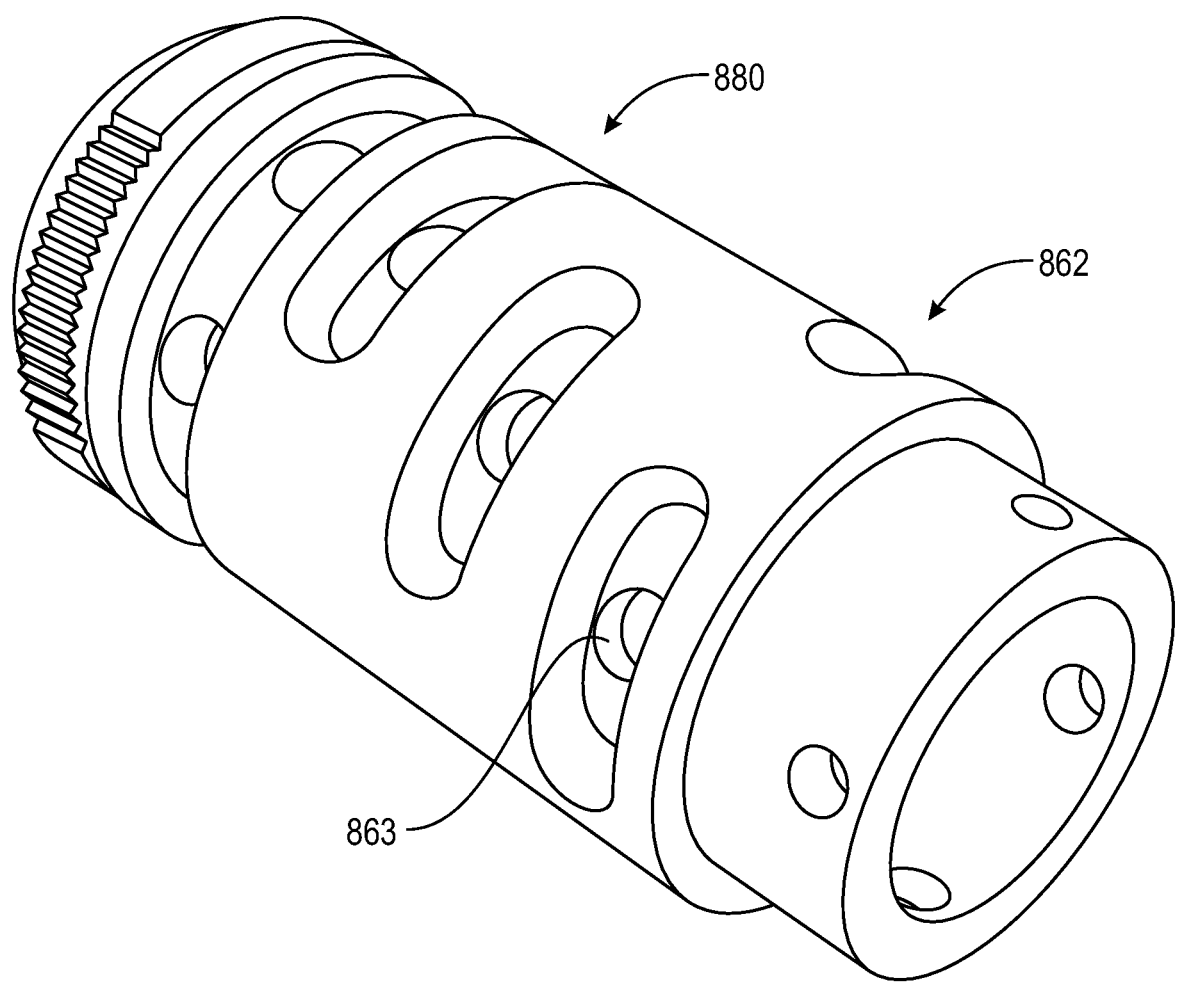
Figure 23A:
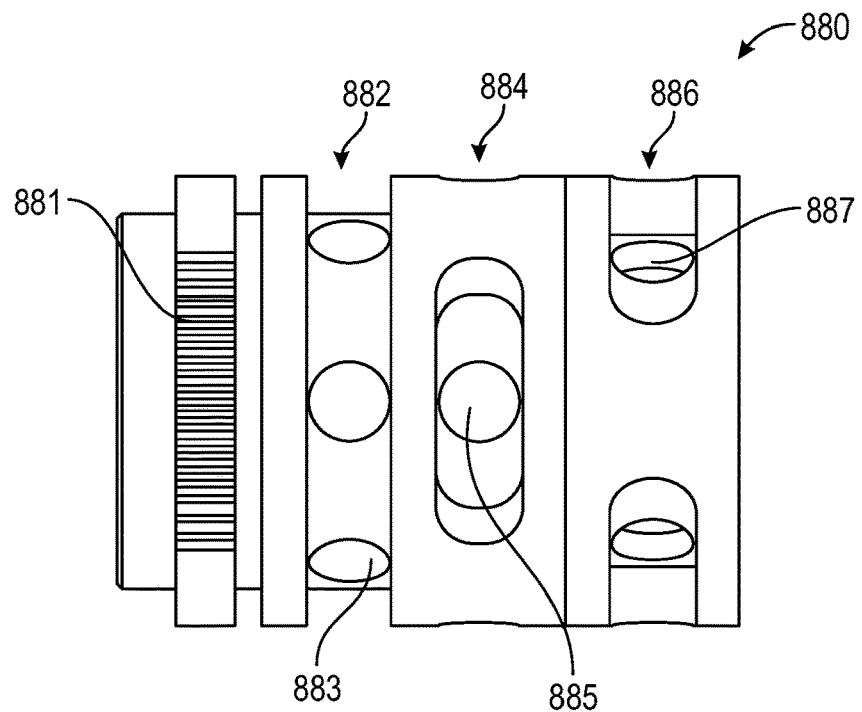
Figure 23B:
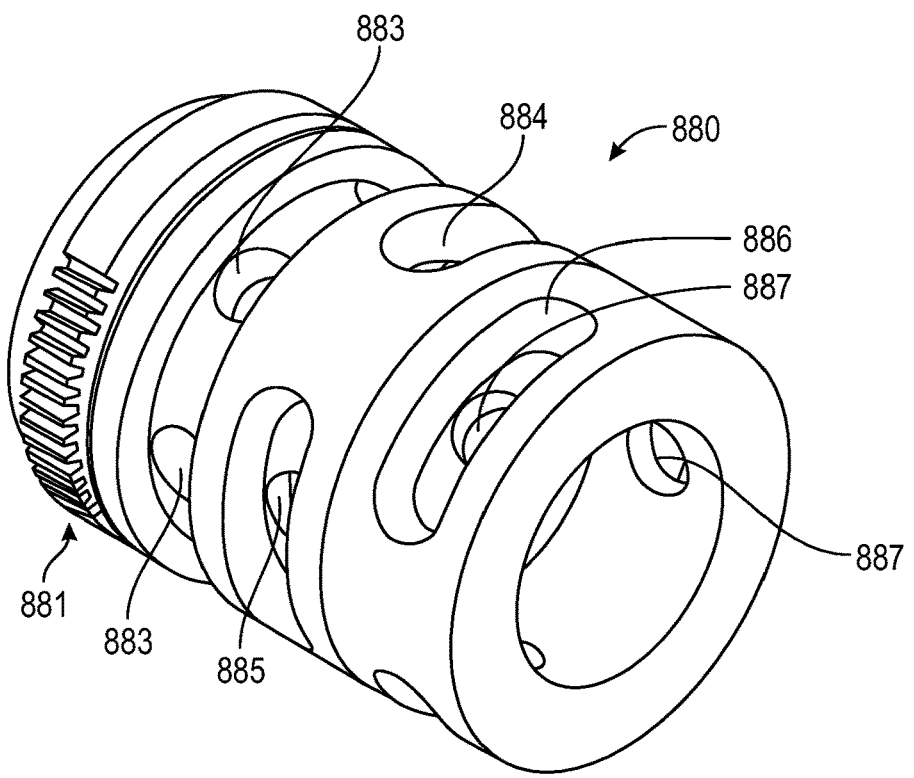

FIG. 22C shows an exemplary opening control ring 880 having a third series of distribution grooves 862 and corresponding holes 863. As FIG. 22C shows, the series of grooves may be orientated to control timing and duration of lift events with respect to one another.

FIGS. 24A and 24B cross-sectionally illustrate an assembled hydraulic distributor 1002 having an internal flow dividing plug 720, a distributor shaft 700, and a plurality of control rings, 760 and 780, in cross section in nearly identical views. The internal flow dividing plug 720, the distributor shaft 700, and the series of control rings 760 and 780 are installed around the distributor shaft 700. The housing 740 encircles the control rings 760 and 780. An actual housing 740 would include internal passages (not shown) for routing hydraulic fluid to the engine valve actuators. These internal passages are not illustrated in the exemplary illustration. FIGS. 24A and 24B are both shown for ease of illustrating the various components.

As FIG. 24A shows, a cavity 721 is formed between a radial outer surface of the internal flow dividing plug 720 and the control rings 760, the cavity cyclically receiving hydraulic flow. In various embodiments, the cavity 721 receiving hydraulic flow from the supply holes 762, sending hydraulic flow to the valves through the distributor holes 763, and sending hydraulic flow back to the pumps through the spill holes 764 at various times and durations of the valve cycles. A second cavity 723 is formed is formed between a radial outer surface of the internal flow dividing plug 720 and the control rings 780, the cavity cyclically receiving hydraulic flow. In one embodiment, the cavity 723 receives hydraulic flow from the supply holes 783 and sends hydraulic flow to the valves through the distributor holes 783 at various times and durations of the valve cycles.

Figure 25B:
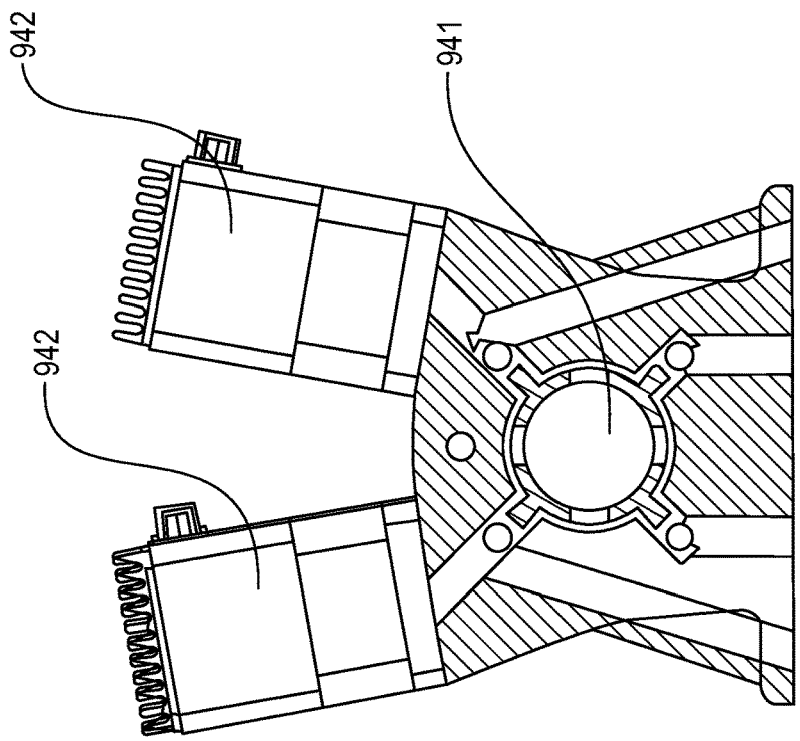
FIGS. 25A and 25B illustrates an exemplary housing including an exemplary internal cylindrical cavity for receiving control rings, a distributor shaft, and an internal flow dividing plug, and stepper motors or other means mounted to an exterior of the housing to control the orientation of the control rings, in accordance with the present disclosure.
Figure 25A:
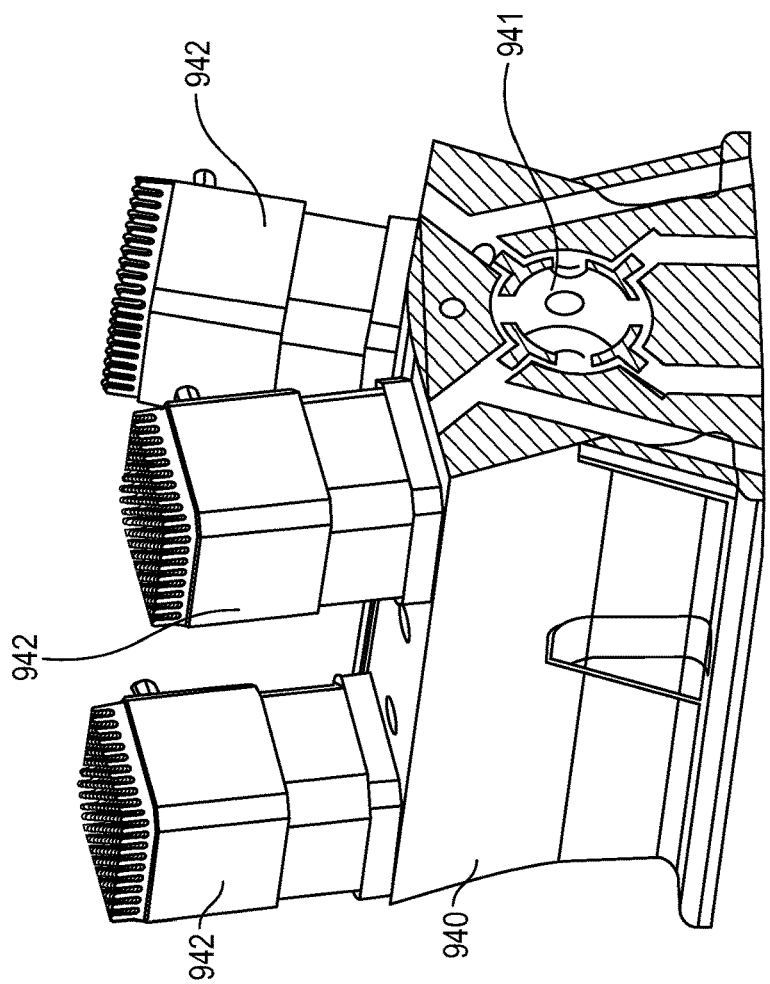

FIG. 25 illustrates an embodiment of the housing 940 including an exemplary internal cylindrical cavity 941 for receiving control rings, a distributor shaft 700, and an internal flow dividing plug 720, and stepper motors 942 or other means mounted to an exterior of the housing 940 to control the orientation of the opening and/or closing control rings.

Figure 26:
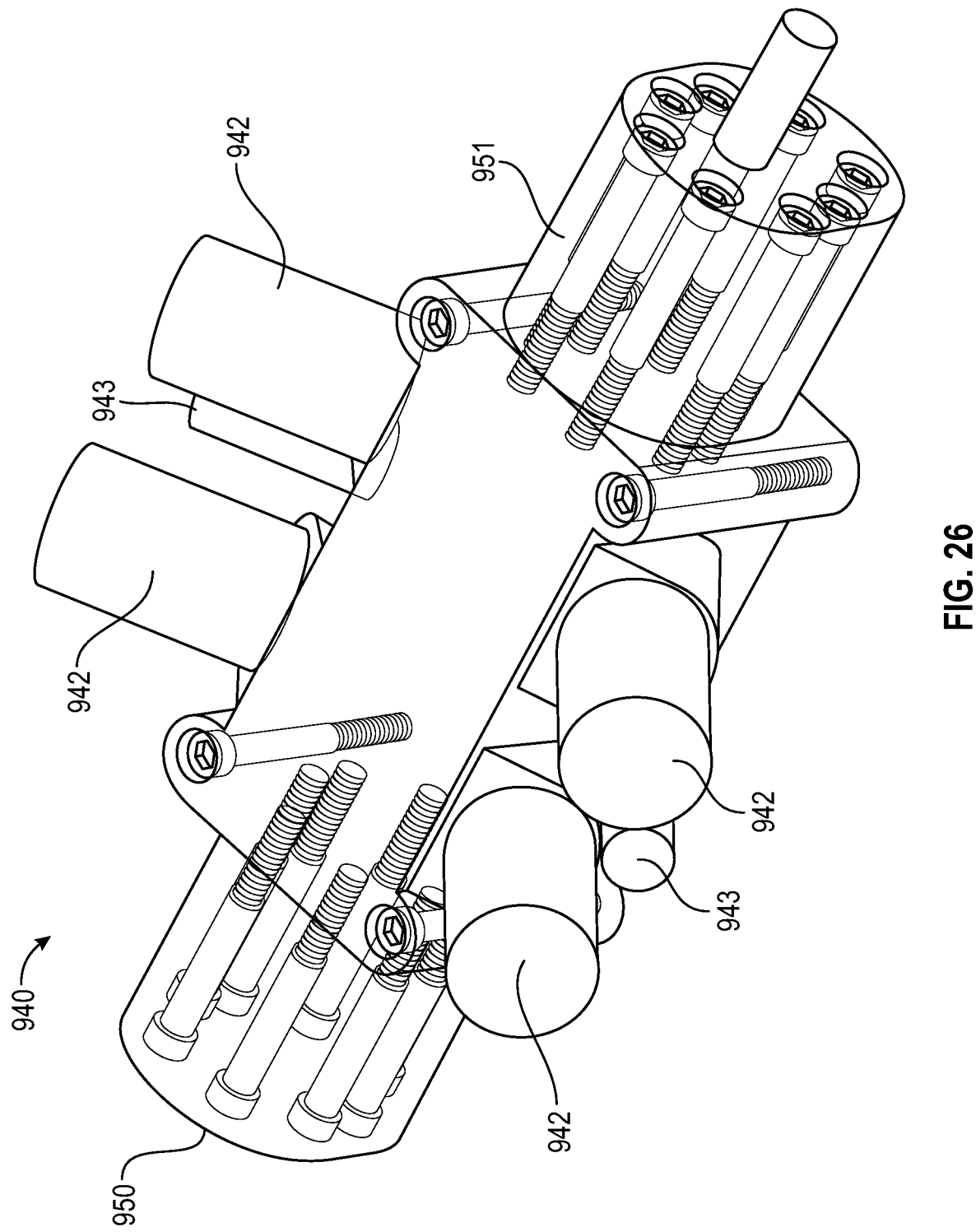
FIG. 26 illustrates an exemplary hydraulic distributor device including, in accordance with the present disclosure.

FIG. 26 illustrates an exemplary hydraulic distributor device including a housing 940, components of the control rings, distributor shaft, and internal flow dividing plug housed inside the housing, hydraulic pumps 950 and 951 mounted to both ends of the housing 940, four stepper motors 942 mounted to the housing, and two high speed bleed valves 943 mounted to the housing, and configured to de-activate any desired cylinder of the controlled engine in any order.

Figures 27A, 27B:
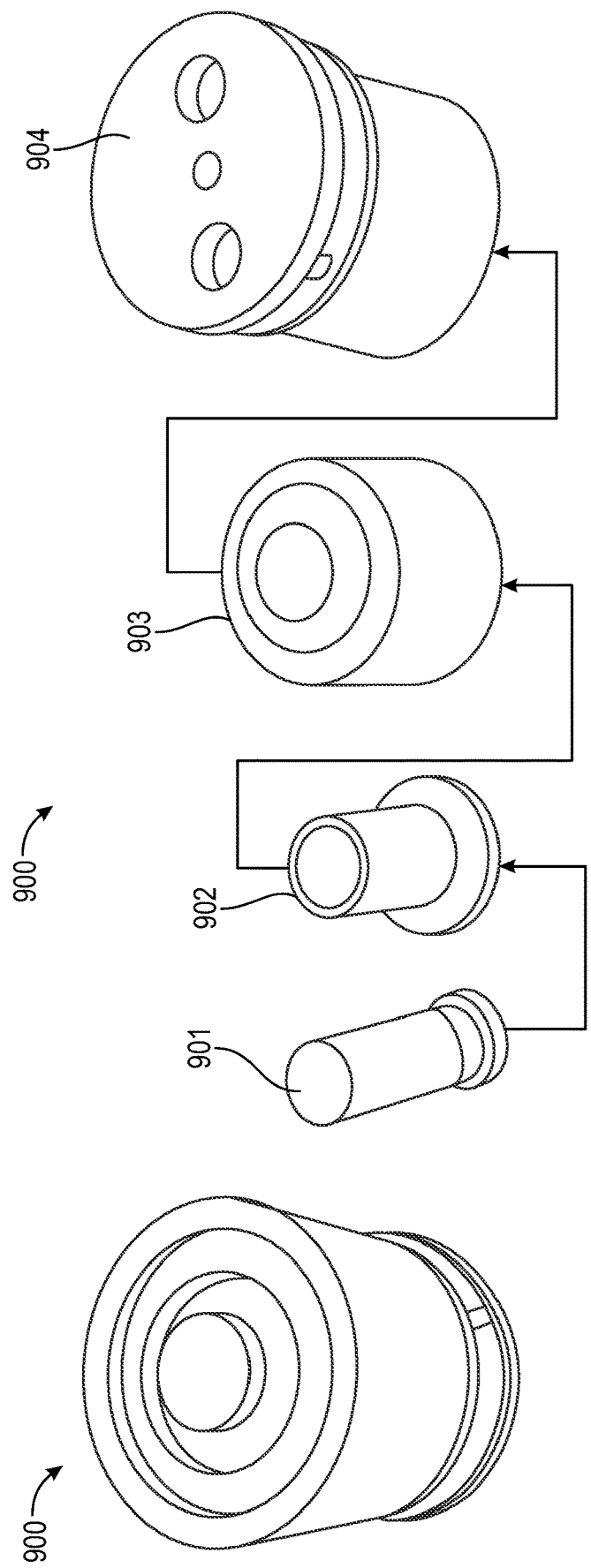
FIGS. 27A and 27B illustrate and details an exemplary 3 stage cartridge actuator or valve that can be controlled by the disclosed device, in accordance with the present disclosure.

FIGS. 27A and 27B illustrates an exemplary 3-stage cartridge actuator 900 or valve that can be controlled by the disclosed device. FIG. 27A shows the actuator 900 in an assembled state, while FIG. 27B shows an exploded view thereof. The actuator 900 can receive pressure from the distributor of FIG. 26 and is extended using first the large piston for a small portion of the valve lift and then the second piston for an additional portion of the lift and ultimately the small piston for the final portion of the lift. Multiple stage pistons provide the capability to open against high cylinder pressure without high hydraulic pressure and provide the ability to shape the opening and closing profiles.

Figure 28:
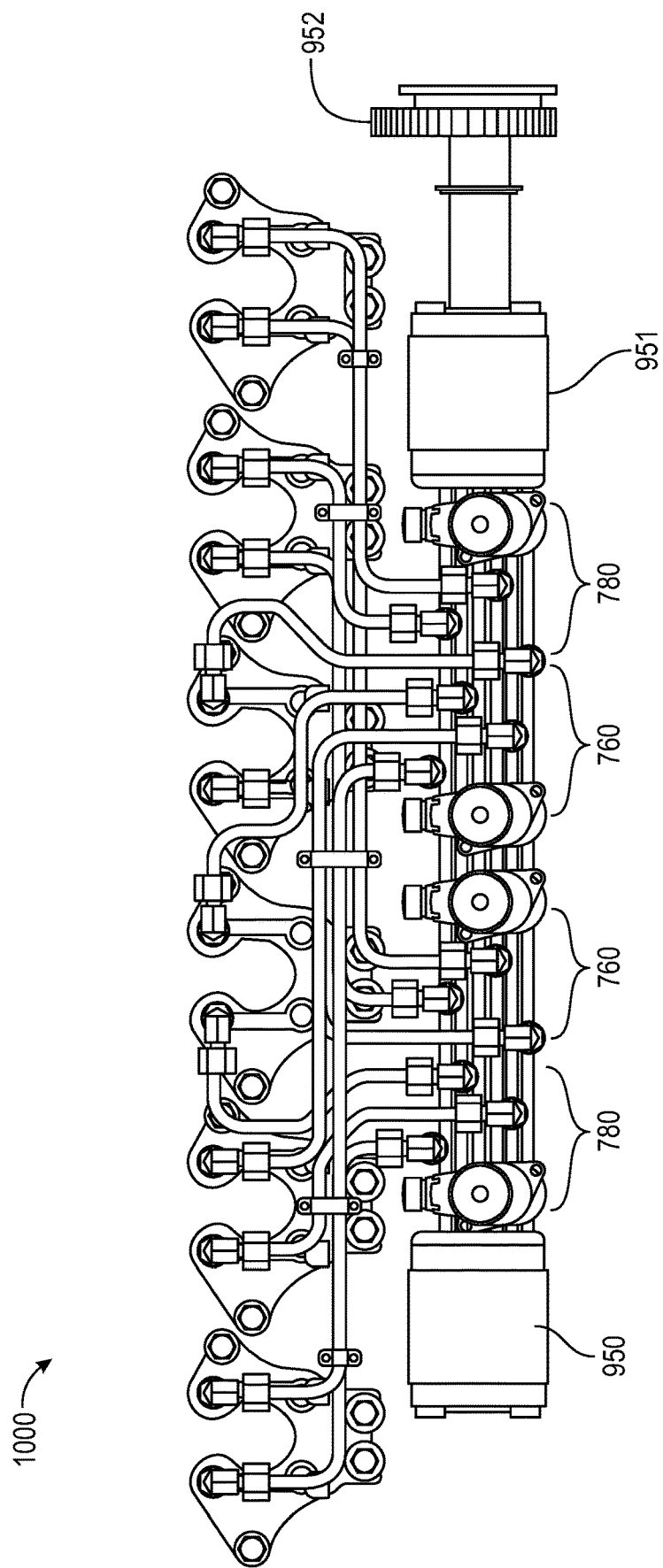
FIG. 28 schematically shows an exemplary camless hydraulic control system for controlling intake and exhaust valve actuation on an engine, in accordance with the present disclosure.

FIG. 28 schematically shows an exemplary camless hydraulic control system 1000 for controlling intake and exhaust valve actuation on an engine. As FIG. 28 shows, the system 1000 can include one or more hydraulic pumps 950 and 951, which can be mounted to both ends of a housing for supplying hydraulic pressure within the system 1000. A gear 952 is provided to receive mechanical power from an engine and transmit to the system 1000. In one embodiment, the gear 952 is sized and adapted to ensure that the hydraulic shaft 700 turns once for every two turns of the crankshaft from the engine. It is contemplated herein that the system 1000 may be mechanically connected to the engine using other mechanical elements such as timing chains or a series of gears with intermeshed teeth to mechanically connect the system 1000 and the engine. As described hereinabove, it is contemplated that the mechanical power transmitted to the system 1000 from the engine is reduced to receive one half-engine speed, although it is contemplated that the shaft 700 and control rings could be adapted to run at engine speed in various embodiments of the disclosure.

Figure 29:
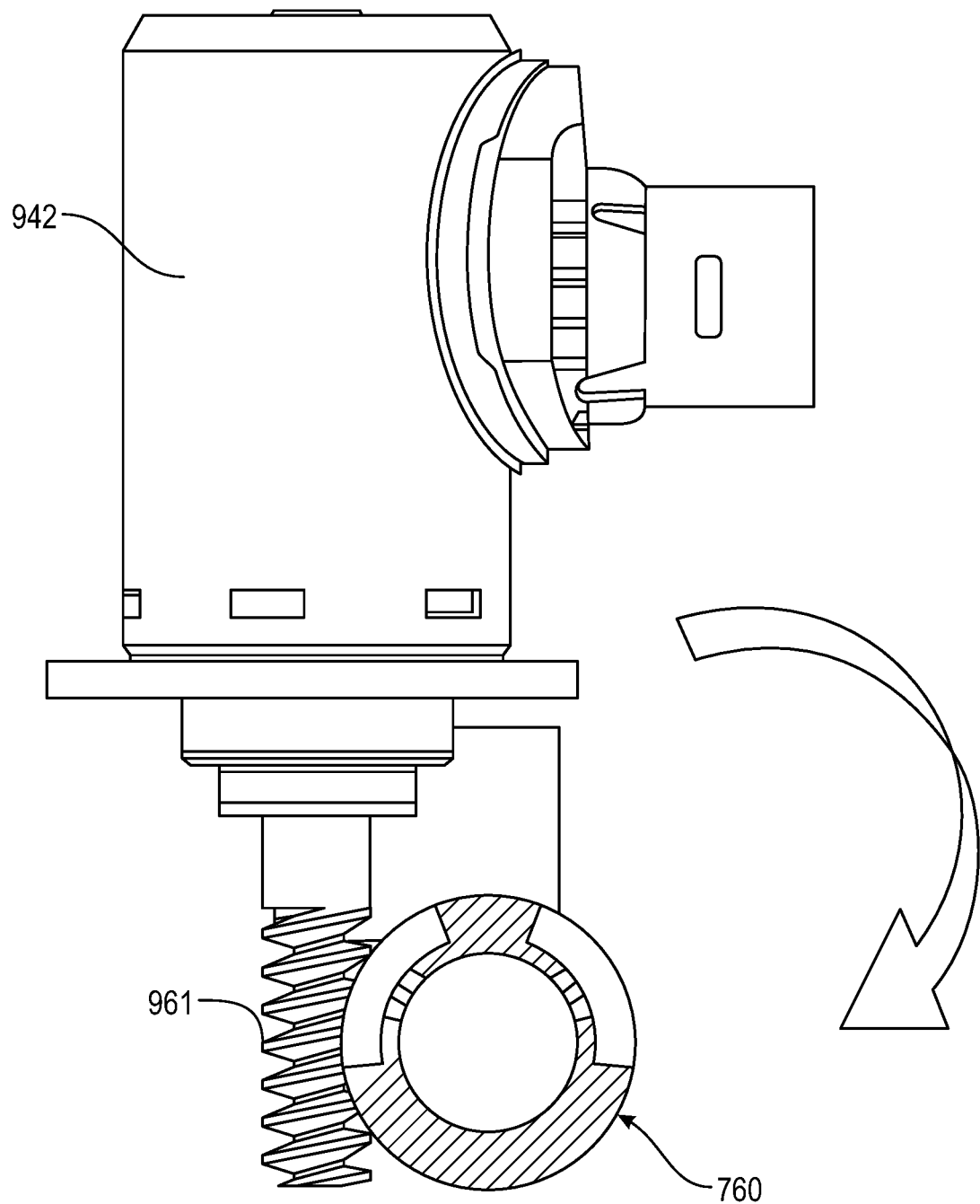
FIG. 29 shows an exemplary stepper motor that may be mechanically connected to an opening or closing control ring, in accordance with the present disclosure.

FIG. 29 shows an exemplary stepper motor 960 that may be mechanically connected to an opening or closing control ring, such as the control ring 760 shown as exemplary. As FIG. 29 shows, the stepper motor 960 may have a mechanical structure 961 configured to engage teeth of the control ring 760 such as the teeth shown in FIGS. 21A, 21B, 22A, 22B, 22C, 23A, and 23B.

Figure 30A:
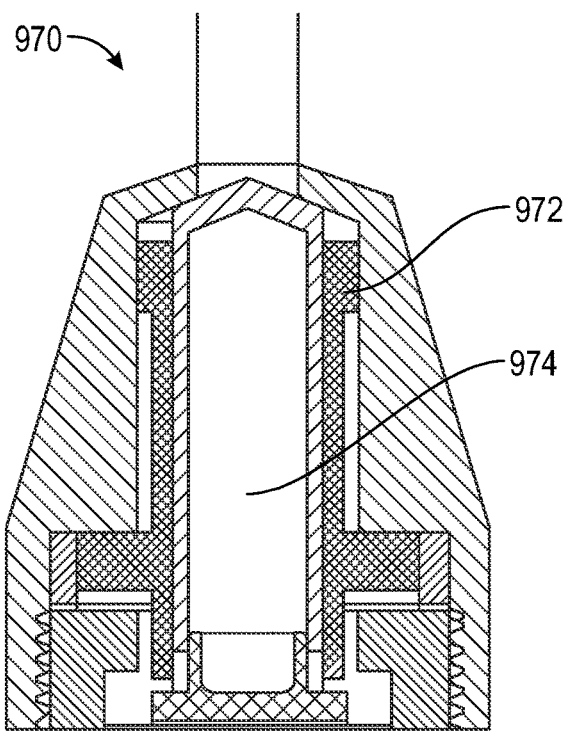
FIGS. 30A and 30B show an exemplary actuator that may be used to control opening or closing of the intake and exhaust valves of the engine, in accordance with the present disclosure.
Figure 30B:
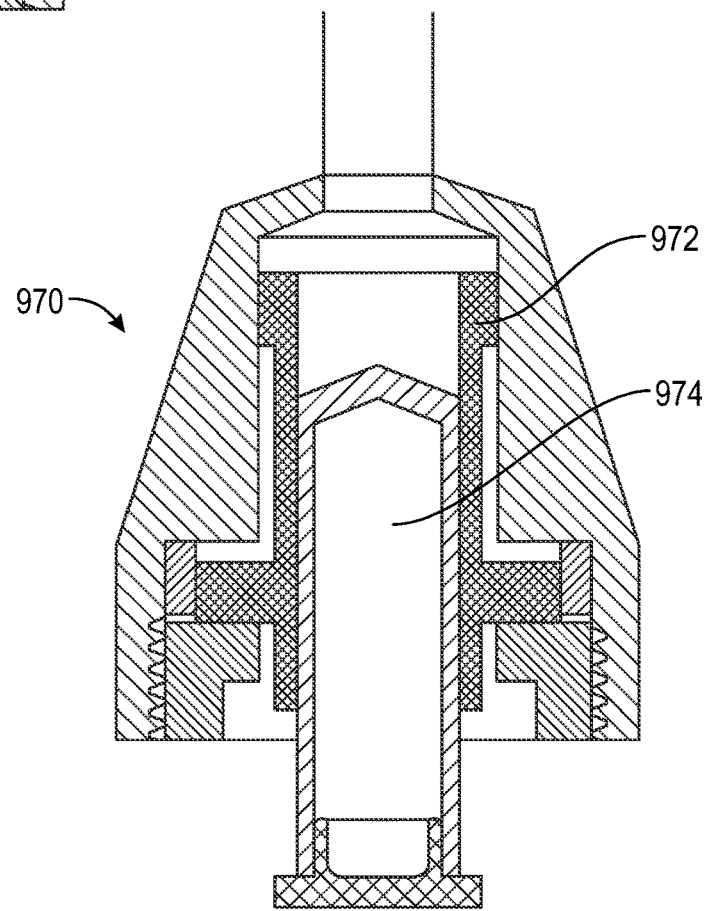

FIGS. 30A and 30B show an exemplary actuator 970 that may be used to control opening or closing of the intake and exhaust valves of the engine. FIG. 30A shows a first state of the actuator and FIG. 30B shows a second state. The actuator 970 is hydraulically connected to the opening and closing control rings. As FIGS. 30A and 30B show, the exemplary actuator 970 may include two pistons. A large piston 972 and a small piston 974 are used in the embodiment depicted. The large piston 972 communicates the initial opening force and control seating velocity, while traveling a small distance compared with the small piston 974. For example, the large piston may be configured to travel 0.5 mm, while the small piston may be configured to travel 11.5 mm Full and complete actuation may be achieved in 80 crank-degrees, in some embodiments.

Figure 31A:
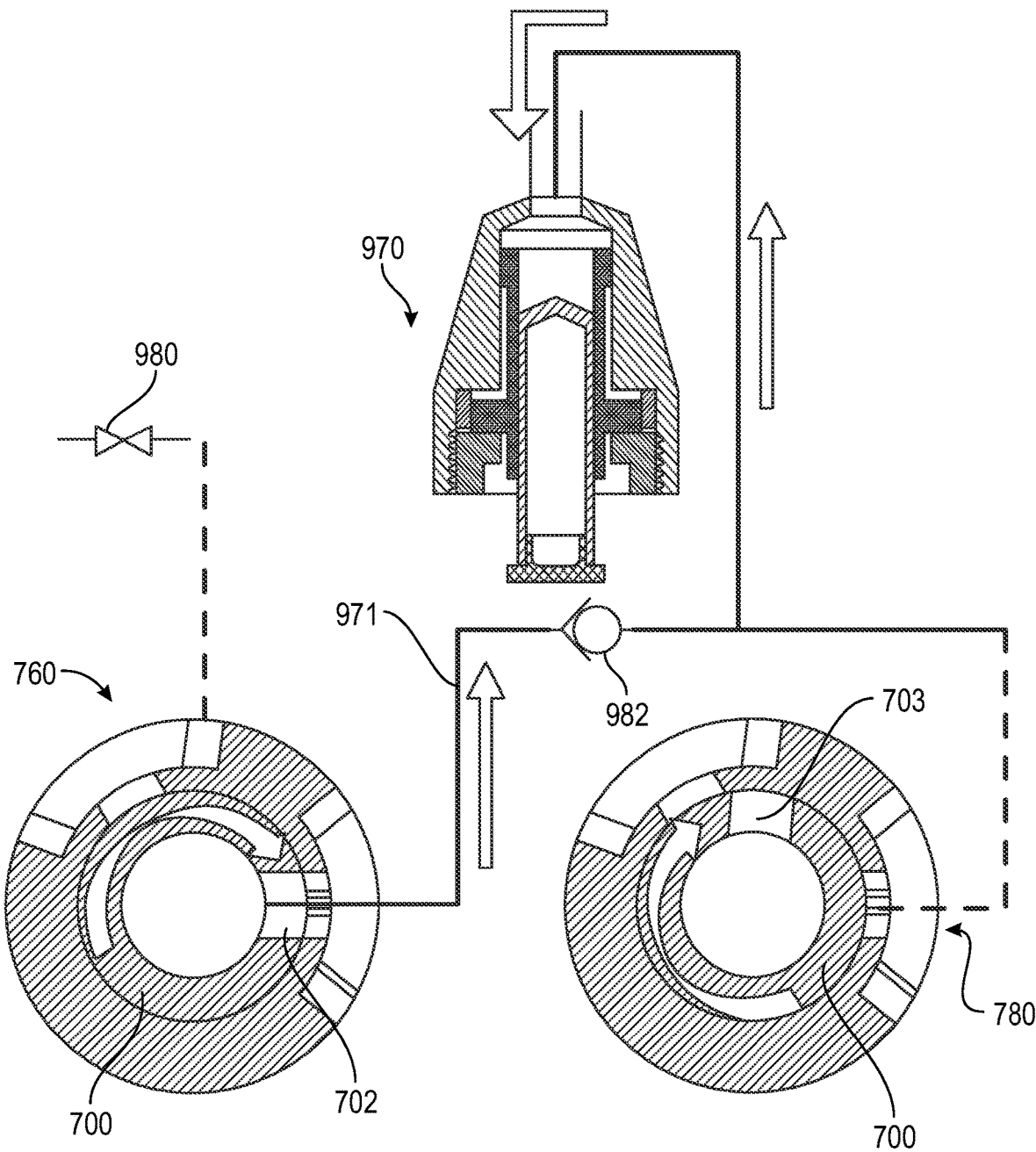
FIGS. 31A and 31B show an exemplary schematic view of the exemplary actuator connected to the opening control ring and the closing control ring.
Figure 31B:
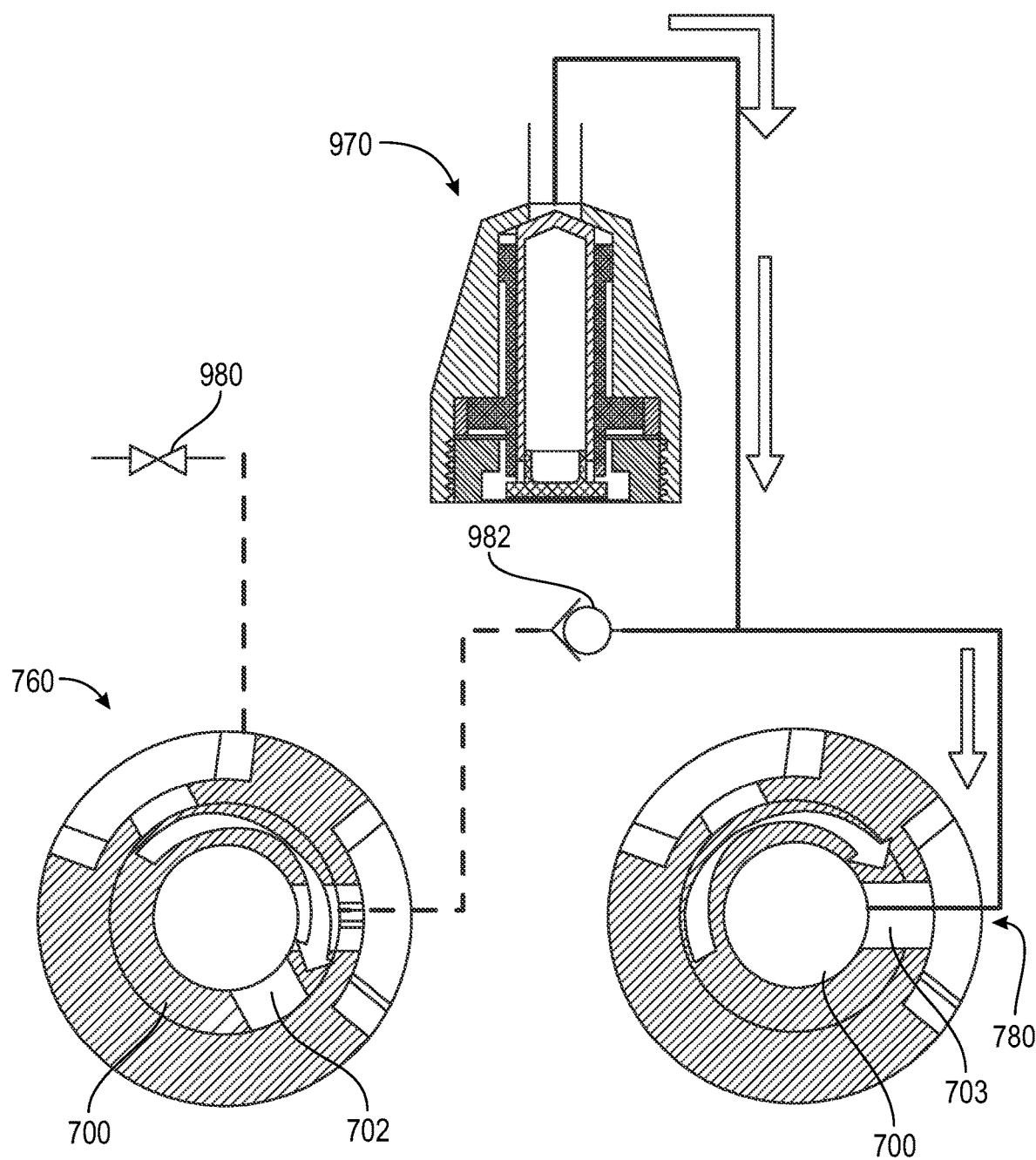

FIGS. 31A and 31B show an exemplary schematic view of the exemplary actuator 970 connected to the opening control ring 760 and the closing control ring 780. The schematic is shown as exemplary. It is contemplated herein that any number of actuators may be concurrently controlled in various embodiments.

FIG. 31A shows an exemplary position of the hydraulic shaft 700 and a hole 702 thereof, with respect the opening control ring 760 enabling hydraulic pressure to actuate the actuator 970. A different hole 703 on the hydraulic shaft 700 is blocked by an inner wall of the closing control ring 780, preventing hydraulic fluid traversal backthough the hydraulic shaft 700, at this position. In this position, the closing control ring 780 does not have holes enabling hydraulic communication with the hydraulic shaft 700. Hydraulic fluid and corresponding pressure traverses the hydraulic line 971 through the check valve 982. The check valve 982 enables supply overlap, while the bleed ports 980 affect opening duration. In one embodiment, high speed bleed valves reduces the duration below 80-crack-degrees in reduced lift.

FIG. 31B shows a second exemplary position of the hydraulic shaft 700, rotated slightly from that shown in FIG. 31A. As FIG. 31B shows, the hole 702 is blocked by an inner wall of the opening control ring 760, preventing hydraulic fluid passage through the opening control ring 760. An opening of the closing control ring 780 is aligned with the hole 703, enabling return of the hydraulic fluid to the hydraulic shaft 700. The check valve 982 blocks hydraulic fluid from returning to the opening control ring 760. Closing of the hole 702 and opening of the hole 703, enables hydraulic fluid flow back to the hydraulic shaft 700. The opening and closing ramps are substantially identical due to the positive displacement of the pumps (pump flow rate controls the profiles).

Figure 32:
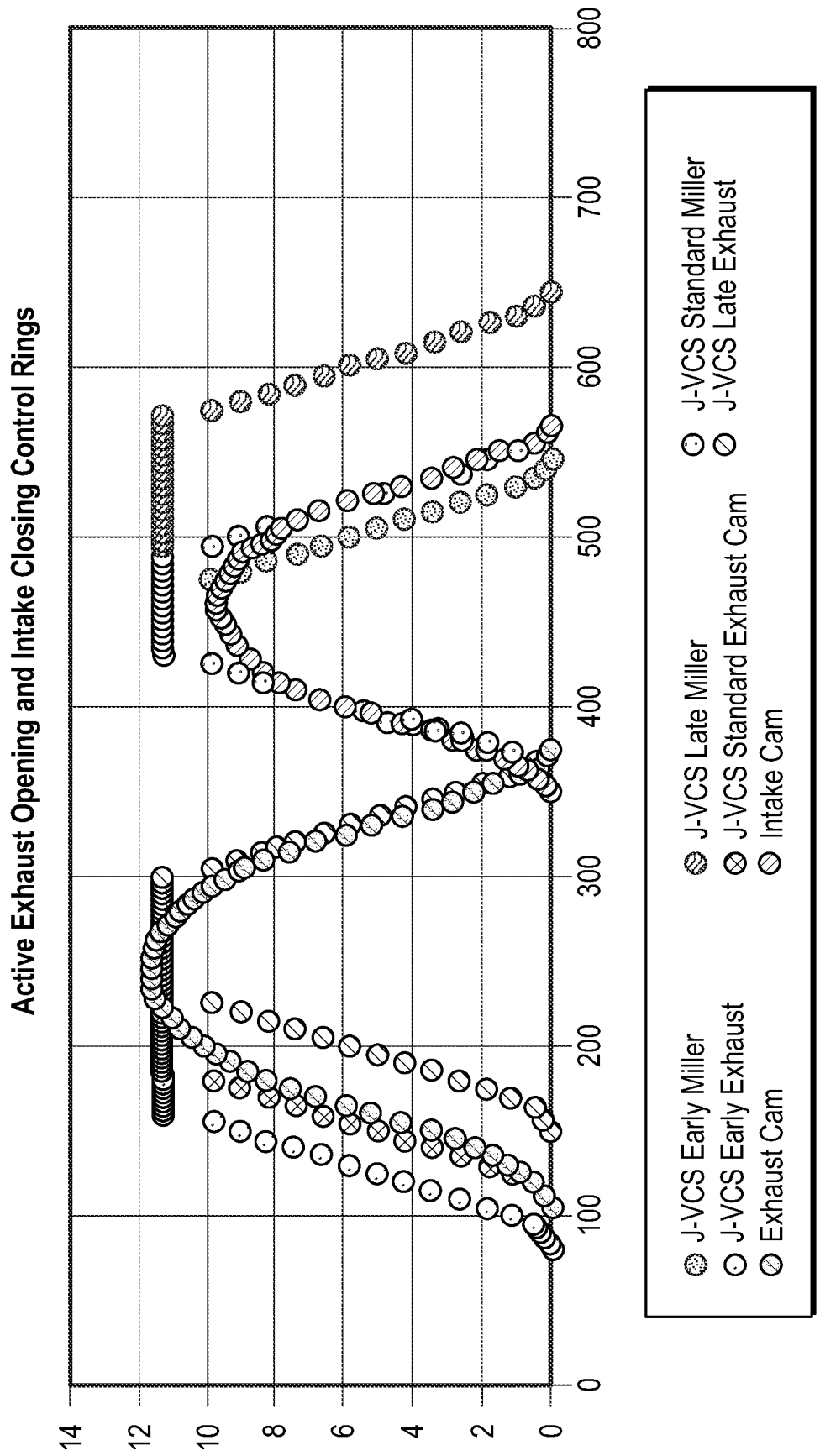
FIG. 32 graphically illustrates various valve control profiles of various exemplary valve control systems during exhaust opening and intake closing.

FIG. 32 graphically illustrates various valve control profiles of various exemplary valve control systems during exhaust opening and intake closing. Some overlap of the intake and exhaust valves is maintained in some profiles.

Figure 33:
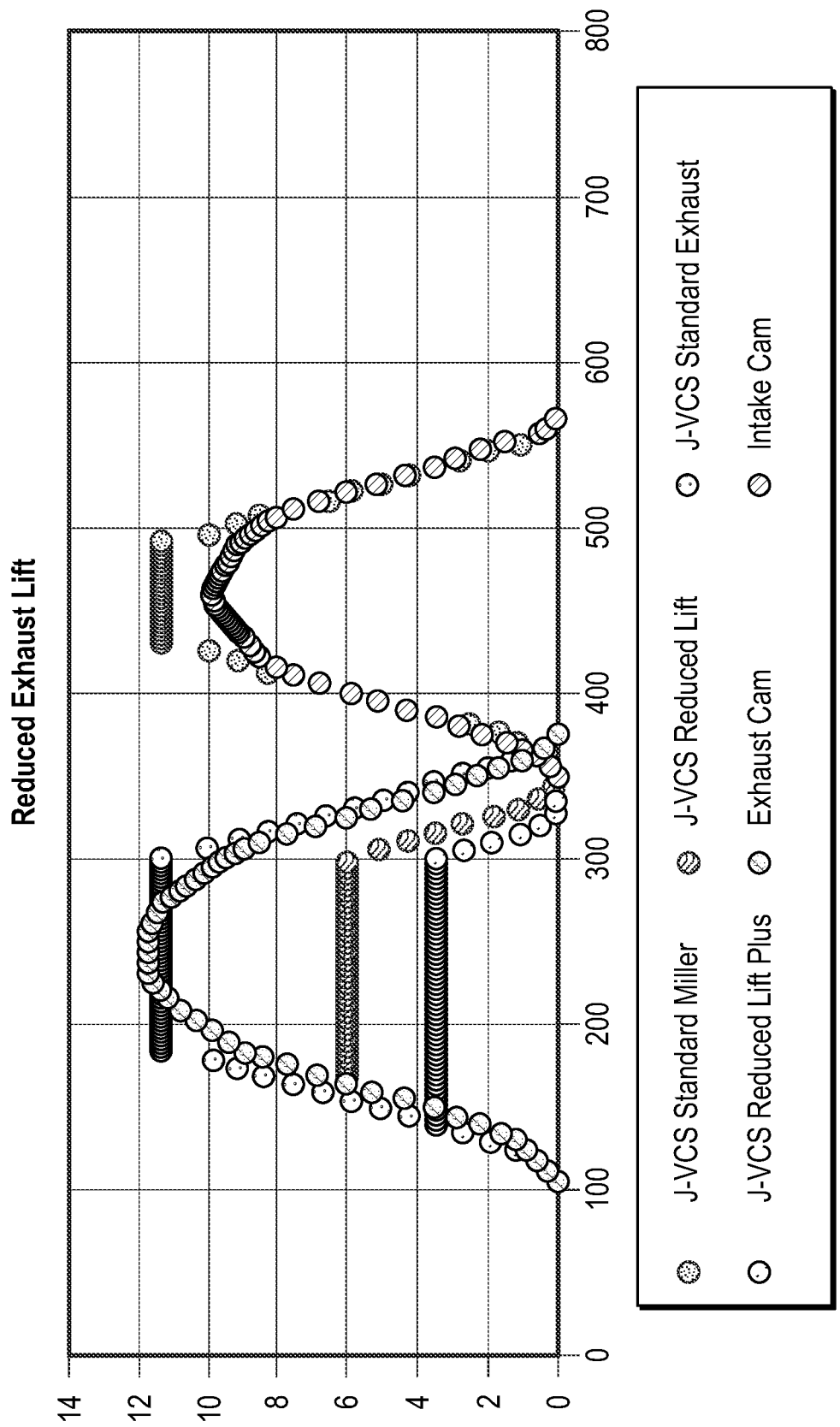
FIG. 33 graphically illustrates various exhaust valve control profiles of various embodiments of the exemplary system.

FIG. 33 graphically illustrates various exhaust valve control profiles of various embodiments of the exemplary system. As FIG. 33 illustrates, reduced exhaust lift can be achieved by reducing the opening duration below 80-crank-degrees with the high-speed bleed valves. Reduced exhaust lift also results in early closing, in some embodiments.

Figure 34:
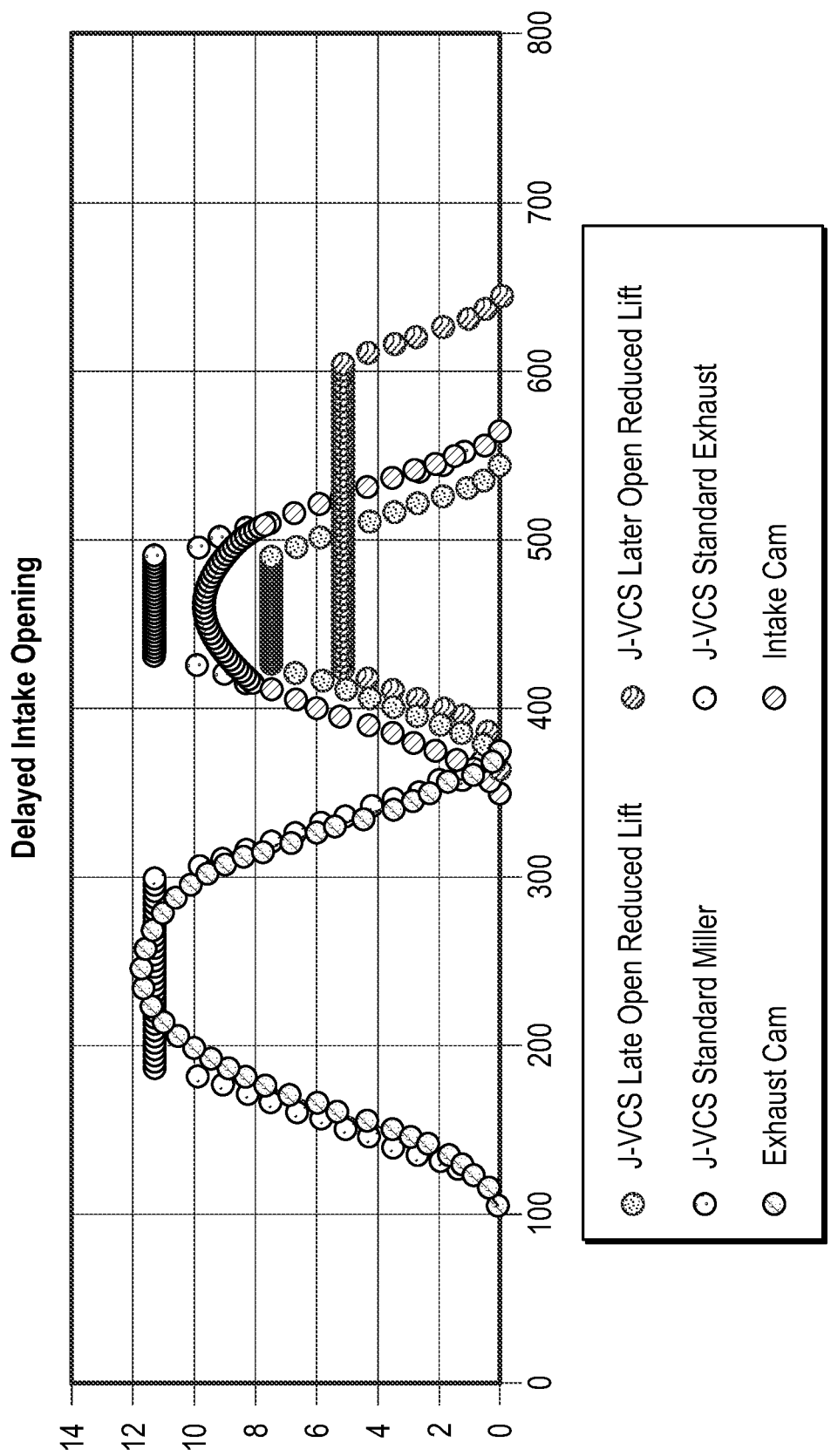
FIG. 34 graphically illustrates various intake valve control profiles of various embodiments of the exemplary system.

FIG. 34 graphically illustrates various intake valve control profiles of various embodiments of the exemplary system. As FIG. 34 illustrates, reduced intake lift can be achieved by reducing the opening duration below 80-crank-degrees with the high-speed bleed valves. Reduced intake lift can result in standard or late opening depending on which end of the duration is reduced, in some embodiments.

Figure 35:
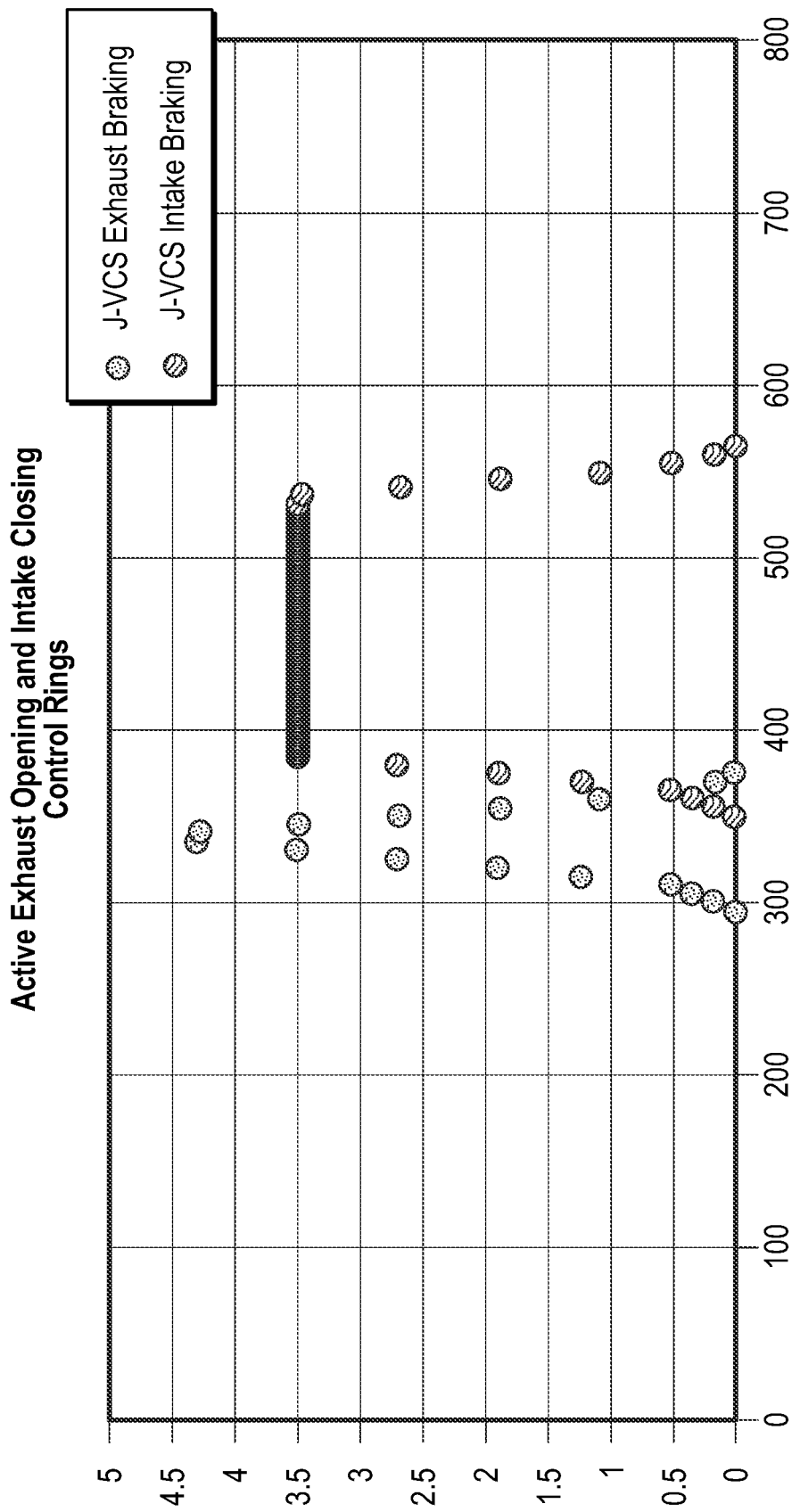
FIG. 35 graphically illustrates intake valve and exhaust valve control profiles of an exemplary braking mode using embodiments of the exemplary system.

FIG. 35 graphically illustrates intake valve and exhaust valve control profiles of an exemplary braking mode using embodiments of the exemplary system. As FIG. 35 illustrates, the intake valve may be controlled to be opened longer, while the exhaust valve is open shorter during one possible braking mode.

Figure 36:
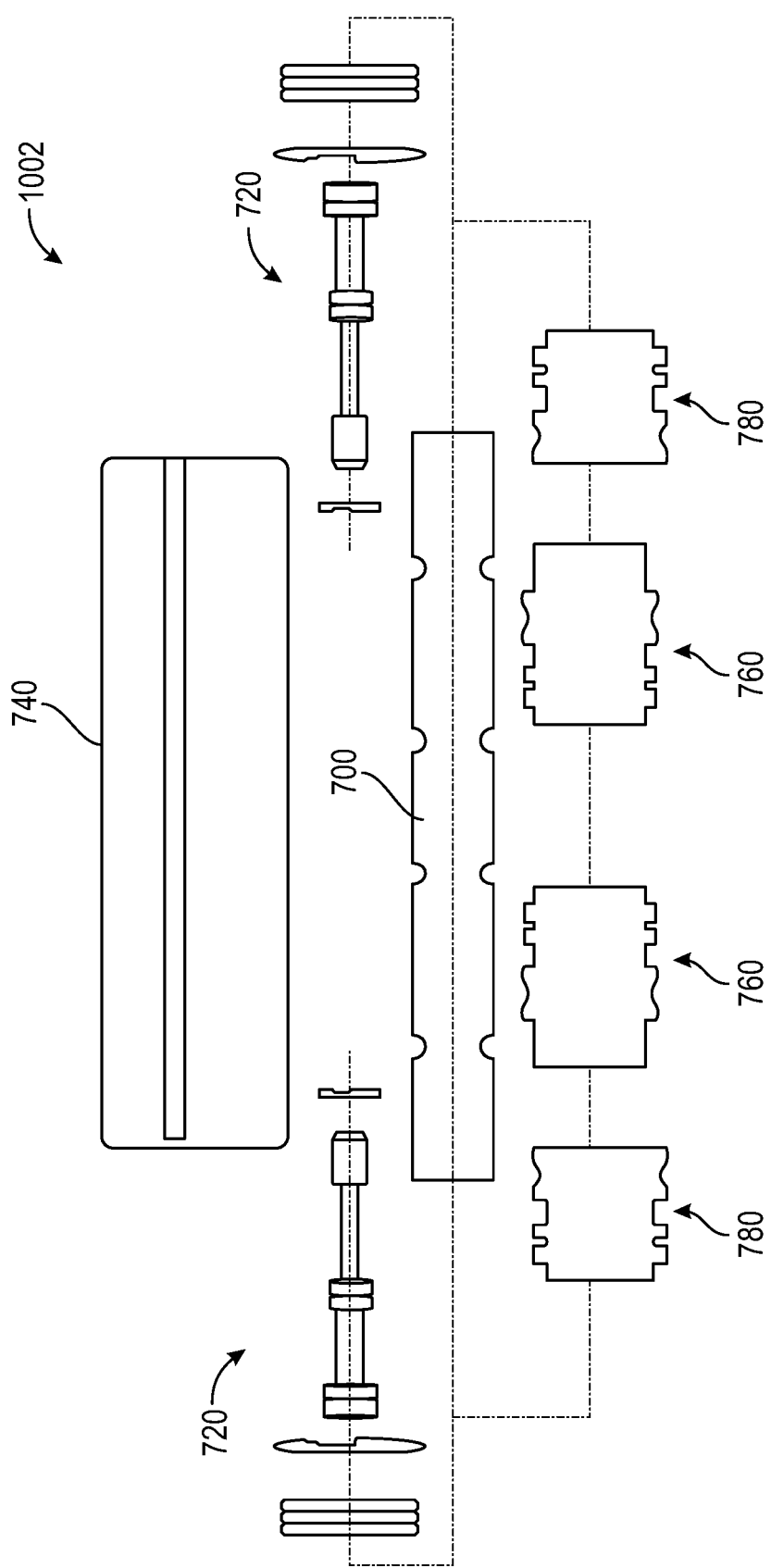
FIG. 36 shows an exemplary exploded view of the hydraulic distributor.

FIG. 36 shows an exemplary exploded view of the hydraulic distributor 1002.

The disclosure has described certain preferred embodiments and modifications of those embodiments. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A camless valve control system for an internal combustion engine, comprising:
   a hydraulic distributor, comprising:
      a rotating distributor shaft timed to an operation of the engine, the rotating distributor shaft comprising an internal flow dividing plug configured to guide an internal hydraulic flow to first and second portions of the rotating distributor shaft;
      an opening control ring oriented coaxially around the rotating distributor shaft, the opening control ring including at least one first hole configured to cyclically align with a corresponding first hole of the rotating distributor shaft and provide an opening hydraulic control so as to open a controlled valve; and
      a closing control ring oriented coaxially around the rotating distributor shaft, the closing control ring including at least one second hole configured to cyclically align with a corresponding second hole of the rotating distributor shaft and provide a closing hydraulic control so as to close the controlled valve.

2. The camless valve control system of claim 1, further comprising:
   a hydraulic flow channel providing cyclical hydraulic flow from the opening control ring to the controlled valve through a check valve.

3. The camless valve control system of claim 1, further comprising:
   a hydraulic flow channel providing cyclical hydraulic flow from the opening control ring to a bleed valve.

4. The camless valve control system of claim 3,
   wherein the bleed valve is configured to selectively deactivate an engine cylinder.

5. The camless valve control system of claim 1, wherein the internal flow dividing plug includes a cavity configured to cyclically receive the hydraulic flow from the at least one first hole.

6. The camless valve control system of claim 1, wherein the at least one first hole comprises:
- at least one supply hole formed in a supply groove of the opening control ring, the at least one supply hole configured to receive the hydraulic flow from a pump;
- at least one distribution hole configured to cyclically align with the corresponding first hole of the rotating distributor shaft so as to supply the hydraulic flow to a valve actuator of the controlled valve, wherein the at least one distribution hole is in cyclical fluid communication with the at least one supply hole; and
- at least one spill port hole configured to cyclically return the hydraulic flow back to the pump.

7. The camless valve control system of claim 1, wherein the at least one second hole comprises:
- at least one supply hole formed in a supply groove of the closing control ring, wherein the at least one supply hole is in hydraulic flow communication with a pump; and
- at least one distribution hole configured to cyclically align with the corresponding second hole of the rotating distributor shaft so as to communicate the hydraulic flow with a valve actuator of the controlled valve, wherein the at least one distribution hole is in cyclical fluid communication with the at least one supply hole.

8. The camless valve control system of claim 6, wherein the at least one supply hole, the at least one distribution hole, and the at least one spill port hole are in cyclical fluid communication with each other via a cavity of the internal flow dividing plug.

9. The camless valve control system of claim 1, wherein the at least one first hole comprises:
- a first series of holes formed within a first groove, the first groove spanning a portion of a circumference of the opening control ring;
- a second series of holes axially spaced from the first series of holes, wherein each hole of the second series of holes is respectively formed within a series of circumferentially spaced second distribution grooves of the opening control ring; and
- a third series of holes axially spaced from the first and second series of holes, wherein the third series of holes is formed within a third groove of the opening control ring or on a recessed surface of the opening control ring having a diameter less than a maximum diameter of the opening control ring.

10. The camless valve control system of claim 9, wherein the third series of holes is formed on the recessed surface and is in fluid communication with a cavity formed between an inner surface of a housing and the recessed surface.

11. The camless valve control system of claim 9, further comprising:
- a fourth series of holes axially spaced between the second and the third series of holes, wherein each hole of the fourth series of holes is respectively formed within a series of circumferentially spaced fourth distribution grooves, and wherein the fourth distribution grooves are circumferentially offset from the second distribution grooves.

12. The camless valve control system of claim 1, wherein the opening control ring further includes a series of integral gear teeth so as to be selectively rotated via a stepper motor.

13. The camless valve control system of claim 12, further comprising:
- a hydraulic flow channel providing cyclical hydraulic flow from the opening control ring to the controlled valve through a check valve.

14. The camless valve control system of claim 12, wherein the internal flow dividing plug includes a cavity configured to cyclically receive the hydraulic flow from the at least one first hole.

15. The camless valve control system of claim 1, wherein the closing control ring further includes a series of integral gear teeth so as to be selectively rotated via a stepper motor.

16. A camless valve control system for an internal combustion engine, comprising:
- a hydraulic distributor, comprising:
  - a rotating distributor shaft timed to an operation of the engine, the rotating distributor shaft comprising an internal flow dividing plug configured to guide an internal hydraulic flow to first and second portions of the rotating distributor shaft;
  - a selectively rotatable opening control ring oriented coaxially around the rotating distributor shaft, the opening control ring including at least one first hole configured to cyclically align with a corresponding first hole of the rotating distributor shaft and provide an opening hydraulic control so as to open a controlled valve via the hydraulic flow through a check valve; and
  - a stationary closing control ring oriented coaxially around the rotating distributor shaft, the closing control ring including at least one second hole configured to cyclically align with a corresponding second hole of the rotating distributor shaft and provide a closing hydraulic control so as to close the controlled valve.

17. The camless valve control system of claim 16, wherein the selectively rotatable opening control ring further includes a series of integral gear teeth so as to be selectively rotated via a stepper motor.

18. The camless valve control system of claim 16, wherein the at least one first hole comprises:
- at least one supply hole formed in a supply groove of the opening control ring, the at least one supply hole configured to receive the hydraulic flow from a pump;
- a first series of distribution holes axially spaced from the at least one supply hole, the first series of distribution holes configured to cyclically align with the corresponding first hole of the rotating distributor shaft so as to supply the hydraulic flow to a first valve actuator, wherein the first series of distribution holes is in cyclical fluid communication with the at least one supply hole, and wherein each distribution hole of the first series of distributed holes is respectively formed within a series of circumferentially spaced first distribution grooves of the opening control ring; and
- a series of spill port holes axially spaced from the at least one supply hole and the first series of distribution holes, the series of spill port holes configured to cyclically return the hydraulic flow back to the pump, wherein the series of spill port holes is evenly distributed around a recessed surface of the opening control ring having a diameter less than a maximum diameter of the opening control ring, and wherein a cavity is formed between an inner surface of a housing and the recessed surface.

19. The camless valve control system of claim 18, further comprising:
- a second series of distribution holes axially spaced between the first series of distribution holes and the series of spill port holes, the second series of distribution holes configured to cyclically align with the corresponding first hole of the rotating distributor shaft so as to supply the hydraulic flow to a second valve actuator, wherein the second series of distribution holes is in cyclical fluid communication with the at least one supply hole, wherein each hole of the second series of distribution holes is respectively formed within a series of circumferentially spaced second distribution grooves of the opening control ring, and wherein the second series of distribution holes is circumferentially offset from the first series of distribution holes.

* * * * *